United States Patent
Ryoo et al.

(10) Patent No.: US 10,342,048 B2
(45) Date of Patent: Jul. 2, 2019

(54) METHOD AND APPARATUS FOR PROCESSING RANDOM ACCESS IN WIRELESS COMMUNICATION SYSTEM

(71) Applicants: Samsung Electronics Co., Ltd, Gyeonggi-do (KR); Korea Advanced Institute of Science and Technology, Daejeon (KR)

(72) Inventors: Sunheui Ryoo, Yongin-si (KR); Sung-Jin Park, Icheon-si (KR); Nam-I Kim, Daegu (KR); Dong-Ho Cho, Seoul (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 15/579,185

(22) PCT Filed: May 30, 2016

(86) PCT No.: PCT/KR2016/005686
§ 371 (c)(1),
(2) Date: Dec. 1, 2017

(87) PCT Pub. No.: WO2016/195346
PCT Pub. Date: Dec. 8, 2016

(65) Prior Publication Data
US 2018/0139784 A1      May 17, 2018

(30) Foreign Application Priority Data

Jun. 2, 2015   (KR) .................. 10-2015-0077892

(51) Int. Cl.
*H04W 88/08*       (2009.01)
*H04W 72/00*       (2009.01)
(Continued)

(52) U.S. Cl.
CPC ....... *H04W 74/0833* (2013.01); *H04L 5/0051* (2013.01); *H04W 72/005* (2013.01);
(Continued)

(58) Field of Classification Search
None
See application file for complete search history.

(56) References Cited

U.S. PATENT DOCUMENTS

2011/0019694 A1   1/2011   Kwon et al.
2013/0021979 A1   1/2013   Kwon et al.
(Continued)

FOREIGN PATENT DOCUMENTS

| KR | 20130011993 A  | 1/2013  |
|----|----------------|---------|
| WO | 2011/122834 A2 | 10/2011 |
| WO | 2014/027868 A1 | 2/2014  |

OTHER PUBLICATIONS

International Search Report dated Aug. 24, 2016 in connection with International Patent Application No. PCT/KR2016/005686.
(Continued)

*Primary Examiner* — Angel T Brockman

(57) ABSTRACT

The present disclosure relates to a 5G communication system or a pre-5G communication system for supporting higher data transmission rate compared to beyond 4G communication system such as LTE. A terminal, according to various embodiments of the present disclosure, comprises: a reception unit for receiving pilot signals; a processor for measuring reception strength of the pilot signals, determining beam-based random access participation on the basis of the measured reception strength, and controlling for an attempt for a beam-based random access if a random access is beam-based random access participation and an attempt
(Continued)

for normal random access if not; and a transmission unit for transmitting a random access signal on the basis of the random access attempt.

20 Claims, 22 Drawing Sheets

(51) Int. Cl.
*H04W 74/08* (2009.01)
*H04L 5/00* (2006.01)
*H04W 72/04* (2009.01)
*H04W 74/00* (2009.01)

(52) U.S. Cl.
CPC ......... *H04W 72/046* (2013.01); *H04W 88/08* (2013.01); *H04W 72/048* (2013.01); *H04W 74/006* (2013.01)

(56) References Cited

U.S. PATENT DOCUMENTS

| | | |
|---|---|---|
| 2013/0229307 A1 | 9/2013 | Chang et al. |
| 2013/0272220 A1 | 10/2013 | Li et al. |
| 2014/0177607 A1 | 6/2014 | Li et al. |
| 2015/0208443 A1 | 7/2015 | Jung et al. |

OTHER PUBLICATIONS

Written Opinion dated Aug. 24, 2016 in connection with International Patent Application No. PCT/KR2016/005686.

METHOD AND APPARATUS FOR PROCESSING RANDOM ACCESS IN WIRELESS COMMUNICATION SYSTEM

CROSS-REFERENCE TO RELATED APPLICATION(S)

The present application claims priority under 35 U.S.C. § 365 to International Patent Application No. PCT/KR2016/005686 filed May 30, 2016 which claims priority to Korean Patent Application No. 10-2015-0077892 filed Jun. 2, 2015, which are incorporated herein by reference into the present disclosure as if fully set forth herein.

TECHNICAL FIELD

The present disclosure relates to a wireless communication system, and more particularly, method and apparatus for processing random access in wireless communication system.

BACKGROUND

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In a mobile communication system, random-access operation of a terminal may be performed when uplink synchronization is performed. Content-based random access is a method in which a terminal randomly selects and transmits a preamble, and collisions may occur when two or more terminals simultaneously transmit the same preamble. According to a contention-based random-access procedure, a terminal attempts random access (transmits a preamble through an access channel) when the terminal needs to obtain uplink synchronization, and a base station may transmit, to the corresponding terminal, a response (random-access response) message in response to the random access. Then, the terminal transmits a random-access procedure message (L2/L3 message), such as an RRC access request message, a tracking area update message, a scheduling request message, and the like, to the base station, and the base station may generate a contention release message to distinguish a terminal corresponding to a recognized preamble, and transmit the same to the corresponding terminal based on a HARQ scheme.

When the terminal attempts the contention-based random access, the terminal performs random access by selecting a preamble that may be used by a plurality of terminals. In this instance, when a plurality of terminals attempts random access, collisions occur, and thus the random access fails. When the terminal attempts random access and does not receive a random-access response (RAR) message within a predetermined period of time (random-access response window), the terminal determines that the random access has failed. The terminal may reattempt random access by increasing transmission power of a preamble. The terminal may transmit a preamble by increasing transmission power until receiving an RAR message from the base station. When the terminal transmits a preamble at the maximum transmission power, the terminal may transmit a preamble by decreasing transmission power to initial transmission power.

SUMMARY

As described above, 4G mobile communication does not use multiple access communication when performing random access. Therefore, in orthogonal multiple access (orthogonal frequency division multiple access (OFDMA)) used in the 4G mobile communication system, interference does not exist among terminals that select different resources, but the maximum communication capacity that can be obtained under the situation of a limited amount of resources (e.g., preamble or the like) may be limited. Therefore, the success rate of random access with a limited amount of random-access resources may be improved by applying multiple access technology when performing random access.

Also, it is expected that next-generation (e.g., 5G) mobile communication technology needs non-orthogonal multiple access, which is beyond the orthogonal multiple access of 4G communication. When non-orthogonal multiple access is used, interference may partly exist among terminals that select different resources, but the communication capacity may be dramatically increased compared to the case of orthogonal multiple access. Also, non-orthogonal multiple access is essential for 5G mobile communication, which leads to an explosive increase in the number of electronic devices which use Internet of things (IoT) and machine-to-machine (M2M) communication.

Therefore, embodiments of the present disclosure propose an apparatus, a system, and control methods therefor, which maximize the use of the limited amount of resources by using multiple access technology when performing random access.

A communication system according to various embodiments of the present disclosure proposes an apparatus and method for transmitting non-overlapping beams or overlapping beams, which enable a plurality of terminals to perform multiple access when the plurality of terminals performs random access using a limited number of preambles.

A terminal device according to various embodiments of the present disclosure proposes an apparatus and method for determining a random-access joining condition based on non-overlapping beams or overlapping beams transmitted in a communication system and performing multiple access to the communication system according to the determined random-access joining condition when performing random access.

A base station according to various embodiments of the present disclosure may include: a communication-processing unit for evaluating the performance of beam-based random access, determining a beam width and the number of beams of random access based on the performance evaluation, and allocating different pilot signals to the determined beams, respectively; a communication unit for communicating a signal allocated by the communication-processing unit; and an antenna controller for transmitting and receiving a signal by controlling beamforming of an antenna according to the beam width and the number of beams determined by the communication-processing unit.

A base station according to various embodiments of the present disclosure may include: a communication-processing unit for setting at least one level for overlapping beams, determining a beam gain based on the level, and allocating different pilot signals to the determined beams; a communication unit for communicating signals allocated by the communication-processing unit; and an antenna controller for transmitting random-access resource information and a base-station reference signal, controlling beamforming such that beams overlap based on the beam gains determined by the communication-processing unit, and transmitting allocated signals.

A terminal according to various embodiments of the present disclosure may include: a reception unit for receiving pilot signals; a processor for measuring the reception strengths of the pilot signals, determining whether to join beam-based random access based on the measured reception strengths, and performing control so as to perform beam-based random access when it is determined to perform beam-based random access or, otherwise, to perform normal random access; and a transmission unit for transmitting a random-access signal according to the attempt of random access.

A terminal according to various embodiments of the present disclosure may include: a reception unit for receiving random-access resource information, level information, a base-station reference signal, and a pilot signal from a base station; a processor for recognizing a level based on the level information and the base-station reference signal, measuring the reception strengths of pilot signals corresponding to the recognized level, selecting a random-access resource based on the measured reception strengths of the pilot signals, and performing control such that beam-based random access is performed using the selected random-access resource; and a transmission unit for transmitting random access information output from the processor.

As described above, a method of a base station according to various embodiments of the present disclosure may include: evaluating the performance of beam-based random access; determining a beam width and the number of beams of random access based on the performance evaluation; forming the determined beams; and allocating different pilot signals to the beamforming signals, respectively, and transmitting the same.

A method of a base station according to various embodiments of the present disclosure may include: setting at least one level for overlapping of beams; transmitting random-access resource information and a base-station reference signal; determining gains of overlapping beams based on the level; and performing beamforming such that beams overlap according to the determined beam gains, allocating different pilot signals to the overlapping beams, and transmitting the same.

The random-access method of a terminal according to various embodiments of the present disclosure may include: receiving pilot signals; measuring reception strengths of pilot signals; determining whether to join beam-based random access based on the measured reception strengths; and attempting beam-based random access when the terminal determines to join beam-based random access, or, otherwise, attempting normal random access.

A random-access method of a terminal according to various embodiments of the present disclosure may include: receiving random-access resource information, level information, a base-station reference signal, and a pilot signal from a base station; recognizing a level based on the level information and the base-station reference signal; measuring the reception strengths of pilot signals corresponding to the recognized level; selecting a random-access resource based on the measured reception strengths of the pilot signals; and performing beam-based random access using the selected random-access resource.

A base station according to various embodiments of the present disclosure may evaluate random-access performance of a plurality of terminals within a coverage area, thereby efficiently determining a beam width and the number of beams. Accordingly, the terminals can efficiently use the limited amount of random access resources. The terminals may attempt random access to the base station at the same time by using the same random-access resources according to a beam width and the number of beams determined by the base station. Therefore, the terminal can improve uplink synchronization performance.

Also, the base station may support overlapping beam-based random access beam by forming a plurality of beams having different strengths in a predetermined beam area, and may allocate different random-access resources to each of the overlapping beams, thereby improving the random-access performance of a terminal. A terminal may analyze downlink information received in an overlapping beam-based random access environment so as to determine a random-access resource, and may attempt random access using the determined random-access resource.

Therefore, the base station according to various embodiments of the present disclosure may embody a non-overlapping beam-based random access environment or an overlapping beam-based random access environment, and a plurality of terminals may perform random access without collision using the same random-access resource in the non-overlapping beam-based random access environment or the overlapping beam-based random access environment.

BRIEF DESCRIPTION OF THE DRAWINGS

Detailed descriptions will be provided with reference to the accompanying drawings for complete understanding of the present disclosure and the advantages thereof. Like reference numerals may refer to like components throughout.

It should be noted that like reference numerals are used to describe the same components, features, and structures throughout the accompanying drawings.

DETAILED DESCRIPTION

Figure 1:
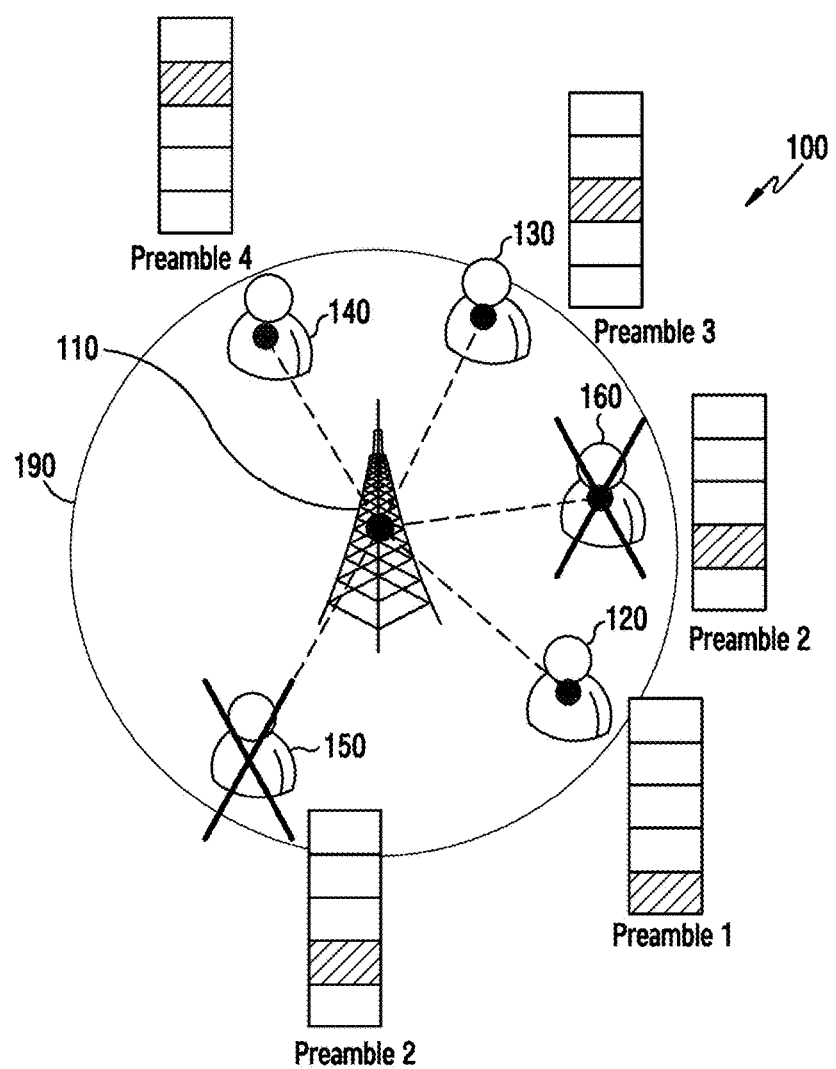
FIG. 1 is a diagram illustrating a system that performs normal random access in a mobile communication system.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In the description of the drawings, similar reference numerals may be used to designate similar elements.

The terms used herein are merely for the purpose of describing particular embodiments and are not intended to limit the scope of other embodiments. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

Hereinafter, various embodiments of the present disclosure will be described based on an approach of hardware. However, various embodiments of the present disclosure include a technology that uses both hardware and software and thus, the various embodiments of the present disclosure may not exclude the perspective of software.

FIG. 1 is a diagram illustrating a system for performing normal random access in a mobile communication system.

Referring to FIG. 1, a mobile communication system 100 may include a base station 110 and terminals 120 to 160.

The base station 110 may provide communication service to the terminals 120 to 160 located within a coverage area 190. The terminals 120 to 160 may attempt random access to the base station 110 in order to obtain uplink synchronization. The terminals 120 to 160 do not always maintain uplink synchronization with the base station 110, and may attempt random access to obtain uplink synchronization when required.

The terminals 120 to 140 transmit different random-access resources (e.g., preambles 1, 3, and 4 of FIG. 1) from those of other terminals, whereby the terminals 120 to 140 may successfully perform random access when they attempt random access at the same time.

However, terminals 150 and 160 transmit the same random-access resource (preamble 2 of FIG. 1), whereby random access may fail. In general, when a large number of various terminals attempt random access in the situation of a limited amount of resources, the failure rate of random access may increase.

Therefore, for efficient random access, there is a desire for a technology which enables multiple terminals to perform multiple access to a base station of a mobile communication using the same resources. One of the multiple access technologies is characterized in that a base station performs beamforming so as to enable multiple terminals to access the base station at the same time. For example, when non-orthogonal multiple access is used, a base station is multiple accessed by terminals which respectively select different resources, and may service communication functions of the terminals, thereby dramatically increasing communication capacity. Also, the 5G mobile communication leads to an explosive increase in the number of terminals which may perform mobile communication such as IoT and M2M, and thus non-orthogonal multiple access may be essential.

A communication system according to various embodiments of the present disclosure may service non-overlapping beam-based random access. In this instance, a base station may control a beam width and the number of beams by taking into consideration the number of terminals for which random access is supportable at the same time, the number of terminals that satisfy a random-access joining condition, and/or the total number of times that random-access collisions occur. The terminal may determine whether to join non-overlapping beam-based random access by measuring a transmission beam, which is the same as a reception beam used for random access, through comparison or absolute evaluation.

A communication system according to various embodiments of the present disclosure may service overlapping beam-based random access. The overlapping beam-based random-access service may be partial contention-based random access or entire contention-based random access. When the partial contention-based scheme of the overlapping beam-based random access is performed, a base station may transmit a beam according to a predetermined level. A terminal may recognize a reception signal strength for each level, and may determine whether to join corresponding random access. When the entire contention scheme of the overlapping beam-based random access is performed, a base station 200 may always transmit beams in all defined directions. A terminal may measure only a reception beam signal strength corresponding to a level to which the terminal belongs, so as to determine whether to join corresponding random access.

When terminals perform non-overlapping-beam-based or overlapping-beam-based random access, the terminals may be allowed to use corresponding beam-based random-access resources only when they satisfy a joining condition. A base station may download (e.g., broadcast) random-access resource information including beam-based random-access resource information and normal random-access resource information to terminals within a coverage area. A terminal senses the strength of a received signal (e.g., a pilot signal) so as to determine whether to perform beam-based random access or normal random access.

Figure 2:
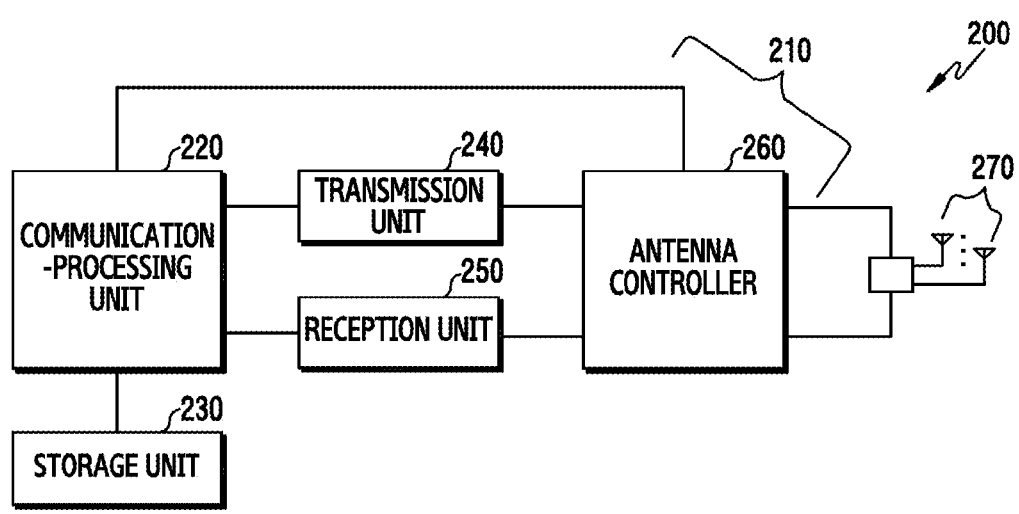
FIG. 2 is a block diagram of a base station in a mobile communication system according to an embodiment of the present disclosure.

FIG. 2 is a block diagram of a base station in a mobile communication system according to an embodiment of the present disclosure.

Referring to FIG. 2, the base station 200 may include a bus 210, a communication-processing unit 220, a storage unit 230, a transmission unit 240, a reception unit 250, an antenna controller 260, and an antenna 270.

The bus 210 may connect the above-described elements to each other, and may forward communication (e.g., a control message) among the above-described elements.

The communication-processing unit 220 may perform operations and functions as follows.

First, the communication-processing unit 220 may perform a function of controlling elements of the base station 200. That is, the communication-processing unit 220 may transfer a control message such that the transmission unit 240, the reception unit 250, and the antenna controller 260 perform appropriate functions.

Second, the communication-processing unit 220 may perform a function of generating a signal. For example, the communication-processing unit 220 may generate a pilot signal, a signal including random-access resource information, and the like.

Third, the communication-processing unit 220 may perform a function of allocating or mapping a signal. For example, the communication-processing unit 220 may allocate a generated pilot signal for each beam, and may map random-access resource information allocated to a terminal to a broadcasting message.

Fourth, the communication-processing unit 220 may perform a function of extracting or detecting required information from a received signal. For example, when a terminal performs random access, the communication-processing unit 220 may extract and detect a random-access resource (e.g., a preamble).

Fifth, the communication-processing unit 220 may evaluate beam-based random access. For example, the communication-processing unit 220 may evaluate, based on random-access resources, how many terminals can successfully perform random access from among terminals that perform beam-based random access.

Sixth, the communication-processing unit 220 may perform a function of determining a transmission or reception beam. For example, the communication-processing unit 220 may determine a beam width and the number of beams based on the beam-based random access evaluation. The communication-processing unit 220 may transfer the determined information associated with the beam width and the number of beams to the antenna controller 260.

Also, the communication-processing unit 220 may have a modulation/demodulation function of modulating a transmission signal and demodulating a reception signal. In this instance, the modulation/demodulation may be an orthogonal scheme (e.g., OFDM) or non-orthogonal scheme (e.g., filter bank multi-carrier (FBMC)).

The storage unit 230 may store an instruction, a program, and the like required in the communication-processing unit 220. Also, the storage unit 230 may store beam-based random-access performance evaluation information evaluated by the communication processing unit 220.

The transmission unit 240 may be a radio-frequency-transmitting unit (RF Tx) which up-converts a transmission signal to an RF band and amplifies power.

The reception unit 250 may be a radio-frequency-receiving unit (RF RX) which amplifies a reception RF signal in a low-noise manner and down-converts the same into a baseband.

Here, the transmission unit 240 and the reception unit 250 may be a communication unit.

The antenna controller 260 may control a beam width, the number of beams, and a beam direction of the antenna 270 under the control of the communication-processing unit 220. For example, the antenna controller 260 keeps the magnitude value of a signal of each antenna regular, evenly distributes phase values, and performs control such that the antenna 270 transmits a signal in a determined direction (beamforming).

Also, the antenna controller 260 may perform control such that the antenna 270 transmits a beam. For example, the antenna controller 260 performs control such that an antenna transmits a beam in a predetermined direction by taking a different signal magnitude value and a different phase value for each antenna. The magnitude value and phase value of a signal for each antenna may be determined based on information on beams, which are determined by the communication processing unit 220.

The antenna 270 may include one or more antennas. Also, the antenna 270 may be configured to be appropriate for multi-input multi-output (MIMO) operation.

Figure 3:
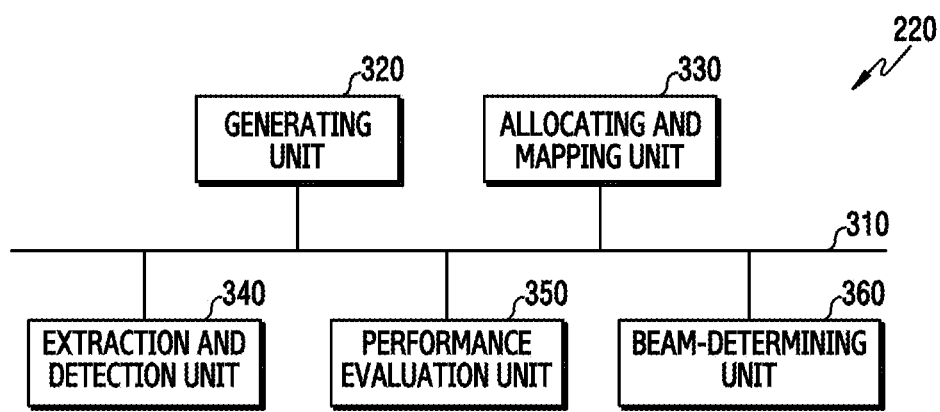
FIG. 3 is a diagram illustrating the configuration of a communication-processing unit according to an embodiment of the present disclosure.

FIG. 3 is a diagram illustrating the configuration of the communication-processing unit 220 according to an embodiment of the present disclosure.

Referring to FIG. 3, the communication-processing unit 220 may include a bus 310, a generating unit 320, an allocating and mapping unit 330, an extraction and detection unit 340, a performance evaluation unit 350, and a beam-determining unit 360.

The bus 310 may connect the above-described elements to each other, and may forward communication (e.g., a control message) among the above-described elements.

The generating unit 320 may generate a signal which is to be transmitted by the base station 200. The signal may include a pilot signal and/or a signal including random-access resource information.

The generating unit 320 may generate a pilot signal. Here, the pilot signal may be used as carrier phase synchronization when a terminal demodulates other channel signals. Also, a pilot signal may have a different phase offset for each base station such that a terminal obtains base station information. Also, the pilot signal may have a different phase offset for each beam such that a terminal identifies different transmission beams of the base station 200. The pilot signal may have a high output such that terminals within a coverage area can receive the pilot signal.

The generating unit 320 may generate a signal including random-access resource information. Here, the random-access resource may indicate a preamble. The random-access resource may include a beam-based random-access resource and/or a normal random-access resource. The normal random-access resource may indicate a resource which may be used when a terminal incapable of performing multiple access-based random access, performs random access. The beam-based random-access resource may indicate a resource which may be used by a terminal that performs beam-based random access. The normal random-access resource and the beam-based random-access resource generated by the generating unit 320 may be transmitted to terminals within a coverage area through broadcasting or the like. The terminal located within the coverage area receives normal and beam-based random-access resources, and may attempt random access by selecting a random-access resource according to its environment when uplink synchronization with a base station is required.

The generating unit 320 may generate level information. Here, a level may be determined to be different based on the distance between the base station 200 and a terminal. The beam-based random-access resource may include level information. The level information may include the location, width, strength, and the like associated with overlapping beams in the case of beam-based random access.

The allocating and mapping unit 330 may allocate and map signals.

The allocating and mapping unit 330 may allocate a pilot signal generated by the generating unit 320 for each transmission beam. Generally, pilot signals may have different values for each base station. However, in an embodiment of the present disclosure, the communication-processing unit 220 may allocate and map a different pilot signal for each determined beam. Therefore, the allocating and mapping unit 330 may allocate pilot signals generated by the generating unit 320 to transmission beams determined by the beam determining unit 360, respectively.

The allocating and mapping unit 330 may map a signal including random-access resource information to a broadcasting signal. The random-access resource information may be normal random-access resource information which is unavailable for random-access service based on multiple access, and beam-based random-access resource information. A terminal may download a signal including the random-access resource information through broadcasting, and may perform random access using a normal or beam-based random-access resource depending on the situation (e.g., the location) of the terminal when random access is required.

The extraction and detection unit 340 may extract and detect required information from a signal received by the base station 200. For example, the extraction and detection unit 340 may extract and detect a random-access resource from a terminal that performs random access according to an embodiment of the present disclosure.

The performance evaluation unit 350 may evaluate the performance of beam-based random access based on the detected information. Particularly, the RA performance evaluation unit 350 may evaluate random access by determining whether a terminal that performs random access performs beam-based random access or normal random access. Also, the performance evaluation unit 350 may evaluate how many terminals successfully perform random access from among terminals that perform beam-based random access.

The beam-determining unit 360 may determine the characteristics of a beam to be output through the antenna 270 based on the RA evaluation. Particularly, the beam-determining unit 360 may determine a beam width, the number of beams, a beam gain, and the like based on the RA evaluation. For example, when the RA performance evaluation unit 350 determines that a small number of terminals perform beam-based random access, the beam-determining unit 360 may broaden the width of a transmission beam and reduce the number of transmission beams. Also, when the performance evaluation unit 350 evaluates that a small number of terminals successfully perform beam-based random access, the beam-determining unit 360 may narrow the width of a transmission beam and increase the number of transmission beams. The beam-determining unit 360 may transfer determined beam information to the antenna controller 260, whereby a determined beam is transmitted/received through the antenna 270.

Figure 4:
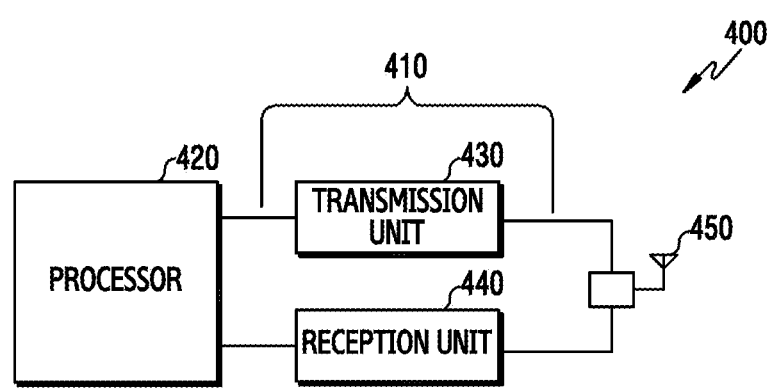
FIG. 4 is a block diagram of a terminal according to an embodiment of the present disclosure.

FIG. 4 is a block diagram of a terminal 400 according to an embodiment of the present disclosure.

Referring to FIG. 4, the terminal 400 may include a bus 410, a processor 420, a transmission unit 430, a reception unit 440, and an antenna 450.

The bus 410 may connect the above-described elements to each other, and may forward communication (e.g., a control message) among the above-described elements.

The processor 420 may measure the strengths of received pilot signals and determine whether to perform beam-based random access. Particularly, the processor 420 may receive pilot signals having different values for each beam, and may measure the strength of each signal. The processor 420 may determine whether a terminal is located in a predetermined beam based on the measured strength. Subsequently, the processor 420 may determine to perform beam-based random access when it is determined that the terminal is located in a predetermined beam. Conversely, the processor 420 may determine to perform normal random access when it is determined that the terminal is not located in a predetermined beam. The processor 420 may determine how to perform beam-based random access.

Also, the processor 420 may determine whether to perform beam-based random access through received random-access resource information. The processor 420 may recognize an allocated random-access resource (e.g., a preamble). The random-access resource may be classified into a normal random-access resource and a beam-based random-access resource, as described above. A terminal may select one of a normal random-access resource and a beam-based random-access resource according to a determination made based on the measured strength of a pilot signal, and may perform random access.

Also, the processor 420 may recognize level information included in the beam-based random-access resource information. The level information may be determined to be different for each distance to the base station (in other words, the strength of a base-station reference signal). For example, when the coverage area of the base station is divided into three sections based on a distance, the level information may be set to level 1 for the closest section to the base station, level 2 for the middle section, and level 3 for the outermost section.

Also, the processor 420 may recognize the level of the terminal by measuring the strength of a received base-station reference signal. Here, it is assumed that the levels are categorized into three levels. The processor 420 may measure the strengths of received reference signals and may distinguish the strengths into three strength levels by comparing the measured strengths with a predetermined threshold value. The processor 420 may recognize that the location of the terminal is level 1 when the reference signal is strong (strength 1), may recognize that the location of the terminal is level 2 when the reference signal has medium strength (strength 2), and may recognize that the location of the terminal is level 3 when the reference signal is weak (strength 3).

The transmission unit 430 may be a radio-frequency-transmitting unit (RF Tx) that up-converts a transmission signal to an RF band and amplifies power. Also, the transmission unit 430 may further include a modulator. The modulator may be an orthogonal scheme (e.g., OFDM) or non-orthogonal scheme (e.g., filter band multi-carrier (FBMC))-based modulator.

The reception unit 440 may be a radio-frequency-receiving unit (RF RX) which amplifies a reception RF signal in a low-noise manner and down-converts the same into a baseband. Also, the reception unit 440 may further include a de-modulator. The demodulator may be an orthogonal-scheme-based or non-orthogonal scheme-based demodulator.

The antenna 450 may receive a signal from a base station and may transmit a signal to the base station. For example, the antenna 450 may receive a pilot signal, a signal including random-access resource information, a base-station reference signal, and the like from the base station. Also, the antenna 450 may transmit a random-access resource to the base station.

Figure 5:
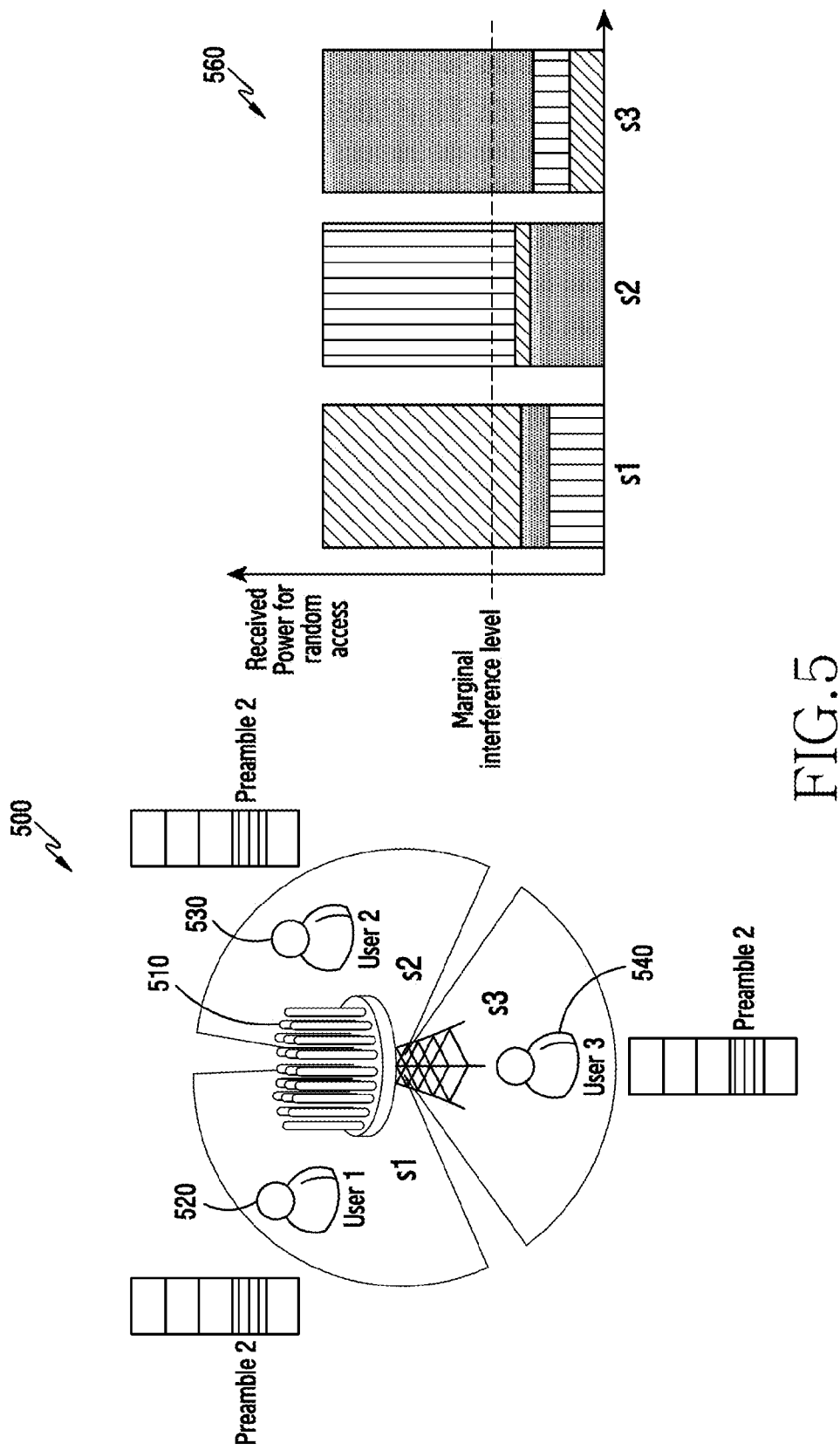
FIG. 5 is a diagram illustrating a communication system that performs non-overlapping beam-based random access according to an embodiment of the present disclosure.

FIG. 5 is a diagram illustrating a communication system for performing non-overlapping beam-based random access according to an embodiment of the present disclosure. FIG. 5 illustrates an example in which a communication system that provides non-overlapping beam-based random access performs forming of three beams so as to provide a random-access service.

Referring to FIG. 5, a communication system 500 may include a base station 510 and terminals 520 to 540.

The base station 510 may perform the functions of the base station 200. The base station 510 may transmit three beams, as illustrated in FIG. 5. The areas of the three beams transmitted by the base station 510 do not overlap each other. Hereinafter, the beams may be expressed as non-overlapping beams in the present document.

Terminals 520 to 540 may perform the functions of the terminal 400. The terminals 520 to 540 may be terminals that perform random access to the base station 200 by simultaneously using the same random-access resource (preamble 2 of FIG. 5). Therefore, when multiple terminals located in different beamforming areas attempt random access using a random-access resource in a communication system that services non-overlapping beam-based random access, the base station 200 may detect random access by the corresponding terminals. That is, in the case of non-overlapping beam-based random access illustrated in FIG. 5, although terminals 520, 530, and 540 perform random access using the same resources, they successfully perform random access without collision. This is because the base station 510 is capable of recognizing a random-access resource for each beam. This may be clarified using a graph 560.

The graph 560 may show a random-access resource received by the base station 510. In the graph 560, the reception strength of the random-access resource received in area S1 by user 1 is greater than or equal to a threshold interference level. However, the reception strength of the random-access resource received in areas S2 and S3 by user 1 is less than or equal to the threshold interference level. The reception strength of the random-access resource received in area S2 by user 2 is greater than or equal to a threshold interference level. However, the reception strength of the random-access resource received in areas S1 and S3 by user 2 is less than or equal to the threshold interference level. Therefore, although user 1 and user 2 use the same resources, the base station 510 may receive the resources by distinguishing the resources, and user 1 and user 2 may successfully perform random access without collision.

An overlapping beam-based random-access method may service random access by overlapping at least two beams. The overlapping beams may have different beam widths or the same beam width. The overlapping beams may have different gains. Also, overlapping beam-based random access may be a partial contention scheme or an entire contention scheme. The beam-based random access method of the partial contention scheme may set beam widths to be different (e.g., setting the beam width of a beam close to a base station to have a wide width, and setting the beam width of a beam distant from the base station to have a relatively narrow width), and may set beam gains to be different according to corresponding levels when setting properties of overlapping beams. The beam-based random-access method of the entire contention scheme may set the beam width to be the same, and may set the strengths of beams to be different according to levels when determining the properties of the overlapping beams.

Figure 6A:
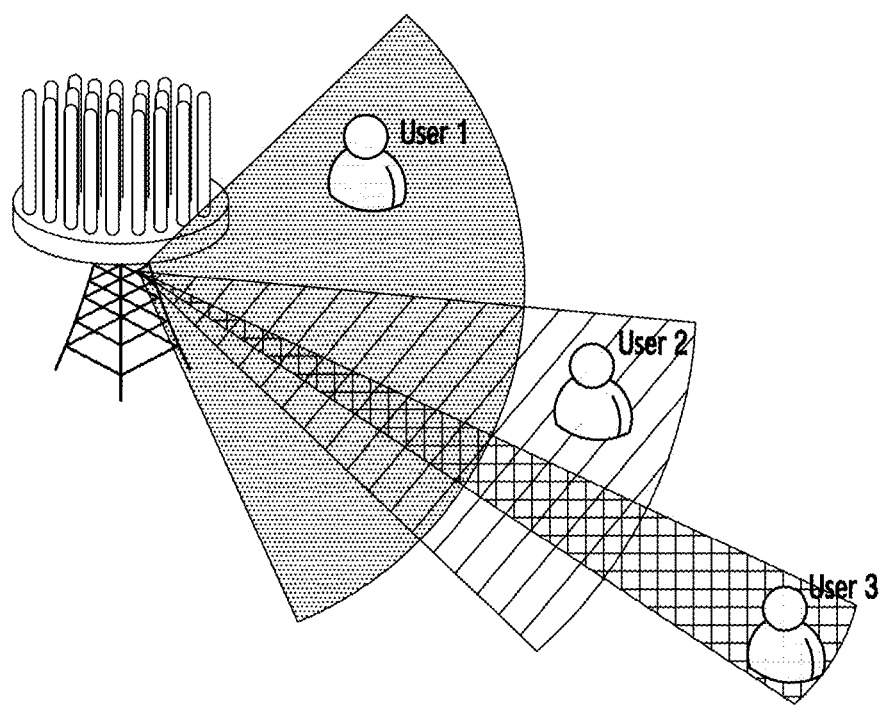
FIGS. 6a and 6b are diagrams illustrating a communication system that performs overlapping beam-based random access according to an embodiment of the present disclosure.
Figure 6B:
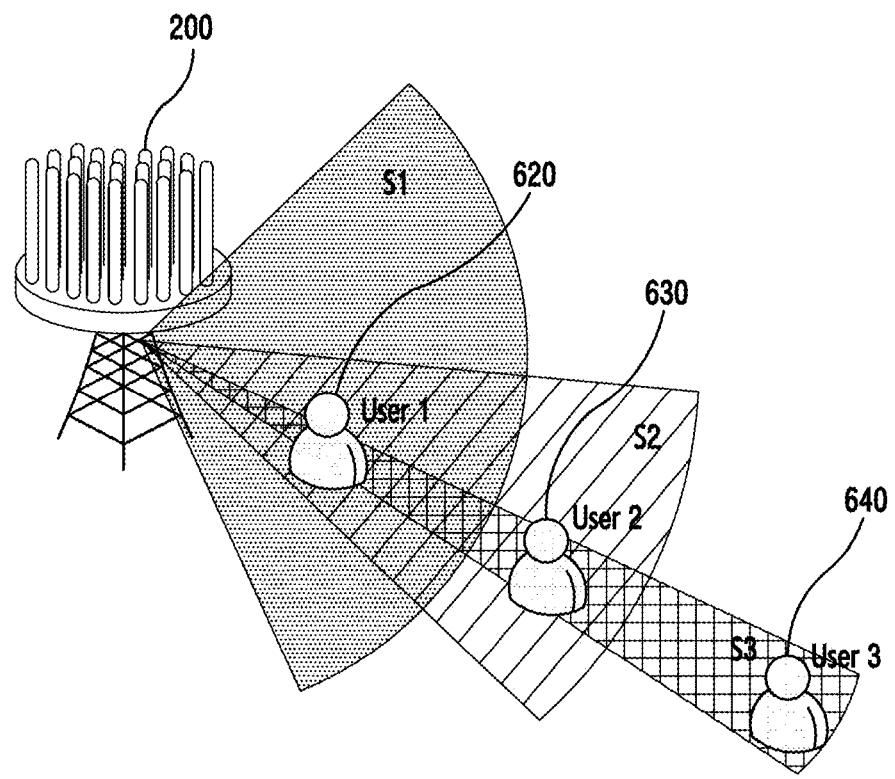

FIGS. 6a and 6b are diagrams illustrating a communication system for performing overlapping beam-based random access according to an embodiment of the present disclosure. FIGS. 6a and 6b illustrate examples of a partial-contention-scheme-based random-access method and examples of beamforming by overlapping three beams having different strengths according to three levels.

Users 1 to 3 of FIG. 6a may perform random access using the same resource for a wide beam, a medium beam, and a narrow beam. In the case of FIG. 6b, user 2 and user 3 may perform random access using relatively limited resources compared to user 1. That is, when beamforming is performing by overlapping beams, the composition of random access contention may be set to be different based on the distance between the location of a terminal and a base station. Therefore, the random-access method of FIG. 6a may set the contention composition as contention among users of which the distances to the base station are similar to each other. The random-access method of FIG. 6b may set the contention composition as contention among all users irrespective of a distance. Therefore, there is a desire for a random access frame structure for handling a random-access collision that may occur among multiple users located in the same direction when the overlapping beams of FIG. 6b are transferred to the users located in the same direction.

Referring to FIG. 6b, a communication system 600 may include the base station 200 and terminals 620 to 640.

The base station 200 may transmit three beams, as illustrated in FIG. 6b. The three beams transmitted by the base station 200 may include different pilot signals, respectively. The areas of the three beams transmitted by the base station 200 may overlap each other, which is referred to as overlapping beams in an embodiment of the present disclosure.

The terminals 620 to 640 may be terminals located in overlapping beams respectively having different levels. The terminal 620 may overlappingly receive three beams (i.e., S1, S2, and S3) transmitted by the base station. The terminal 630 may overlappingly receive two beams (i.e., S2 and S3) transmitted by the base station. The terminal 640 may receive a beam (S3) transmitted by the base station. When the terminal 620 and the terminal 630 simultaneously attempt random access using the same resources, the base station 200 is incapable of distinguishing a random-access resource used by the terminal 620 and a random-access resource used by the terminal 630, whereby the random access of the terminals 620 and 630 may fail due to a collision. However, in the case of the overlapping-beam-based random access according to an embodiment of the present disclosure, a terminal is capable of selecting a random-access resource in consideration of its level, thereby preventing collisions. For example, the terminal 620 may perform random access by selecting an available random-access resource (i.e., selecting a random-access resource of beam S1) excluding random-access resources that the terminal 630 and the terminal 640 may use (i.e., random-access resources of beams S2 and S3), based on the level (e.g., level 1) of the terminal 620. The terminal 630 may perform random access by selecting an available random-access resource (i.e., selecting a random-access resource of beam S2) excluding a random-access resource that the terminal 640 may use (i.e., random-access resources of beam S3), based on the level (e.g., level 2) of the terminal 630.

FIGS. 6a and 6b are diagrams illustrating overlapping beams based on three levels, which are provided for illustrative purposes. When necessary, overlapping beams according to various embodiments may be based on N levels.

A base station according to various embodiments of the present disclosure includes: a communication processing unit for evaluating the performance of beam-based random access, determining a beam width and the number of beams of random access based on the performance evaluation, and allocating different pilot signals to the determined beams; a communication unit for communicating a signal allocated by the communication-processing unit; and an antenna controller for transmitting and receiving a signal by controlling beamforming of an antenna according to the beam width and the number of beams determined by the communication-processing unit.

The communication-processing unit includes a performance evaluation unit and a beam-determining unit. The performance evaluation unit evaluates the performance of beam-based random access based on the number of terminals that perform beam-based random access, and the beam-determining unit may control a beam width and the number of beams according to the number of terminals that perform beam-based random access.

The performance evaluation unit may further evaluate the performance of beam-based random access based on the number of terminals that experience collision from among terminals that perform beam-based random access, and the beam-determining unit may control a beam width and the number of beams based on the number of terminals that perform beam-based random access and the number of terminals that experience random-access collisions.

According to various embodiments of the present disclosure, the communication-processing unit may further include a generating unit. The generating unit generates random-access resource information, and the random-access resource information may include beam-based random-access resource information and normal random-access resource information.

The random-access resource information may further include beam level information. The beam-determining unit may determine, based on the level information, gains of beams that overlap in at least a part of the determined beam width, and the antenna controller controls beamforming based on the beam width and the number of beams, and overlappingly transmit beams to beam areas corresponding to the levels.

A base station according to various embodiments of the present disclosure includes: a communication-processing unit for setting at least one level for overlapping beams, determining a beam gain based on the level, and allocating different pilot signals to the determined beams; a communication unit for communicating signals allocated by the communication-processing unit; and an antenna controller for transmitting random-access resource information and a base-station reference signal, controlling beamforming such that beams overlap based on the beam gains determined by the communication-processing unit, and transmitting allocated signals.

The antenna controller receives a terminal's beam-based random access information, received through the overlapping beam areas, and provides the same to the communication unit.

A terminal according to various embodiments of the present disclosure includes: a reception unit for receiving pilot signals; a processor for measuring the reception strengths of the pilot signals, determining whether to join beam-based random access based on the measured reception strengths, and performing control to perform beam-based random access when it is determined to perform beam-based random access, or otherwise to perform normal random access; and a transmission unit for transmitting a random-access signal according to the attempt of random access.

According to various embodiments of the present disclosure, the processor determines to join beam-based random access when the maximum value exists among the measured reception strengths of the pilot signals.

According to various embodiments of the present disclosure, the processor may determine to join beam-based random access when the maximum reception strength of a pilot signal from among the measured reception strengths of the pilot signals is greater than the sum of the reception strengths of the remaining pilot signals.

According to various embodiments of the present disclosure, the processor may determine to join beam-based random access when the maximum reception strength of a pilot signal from among the measured reception strengths of the pilot signals is greater than or equal to a predetermined threshold value, and the reception strengths of the remaining pilot signals are less than or equal to the threshold value.

According to various embodiments of the present disclosure, the processor may determine to join beam-based random access when the maximum reception strength of a pilot signal from among the measured reception strengths of the pilot signals is greater than or equal to a predetermined threshold value, and the sum of the reception strengths of the remaining pilot signals is less than or equal to the threshold value.

The reception unit receives beam-based random-access resource information and normal random-access resource information. The processor performs control to perform random access using the beam-based random-access resource when it is determined to perform beam-based random access, and to perform random access using the normal random-access resource when it is determined not to perform beam-based random access.

According to various embodiments of the present disclosure, the reception unit further receives level information and a base-station reference signal from the base station. The processor recognizes a level based on the base-station reference signal and the level information, and determines whether to join beam-based random access based on the recognized level and the measured reception strength.

A terminal according to various embodiments of the present disclosure includes: a reception unit for receiving random-access resource information, level information, a base-station reference signal, and a pilot signal from a base station; a processor for recognizing a level based on the level information and the base-station reference signal, measuring the reception strengths of pilot signals corresponding to the recognized level, selecting a random-access resource based on the measured reception strengths of the pilot signals, and performing control such that beam-based random access is performed using the selected random-access resource; and a transmission unit for transmitting random access information output from the processor.

The processor selects a pilot signal having the maximum reception strength from among second pilot signals excluding first pilot signals from the measured pilot signals, and selects a random-access resource corresponding to the selected pilot signal.

The first pilot signals indicate pilot signals having the maximum reception strength in other levels, and the second pilot signals are pilot signals remaining after the first pilot signals are excluded from among the received pilot signals.

According to various embodiments of the present disclosure, the processor selects a random-access resource corresponding to the pilot signal having the maximum reception strength from among the measured pilot signals.

Hereinafter, non-overlapping beam-based random-access operation according to an embodiment of the present disclosure will be described in detail.

First, non-overlapping beam-based random-access operation will be described.

Figure 7:
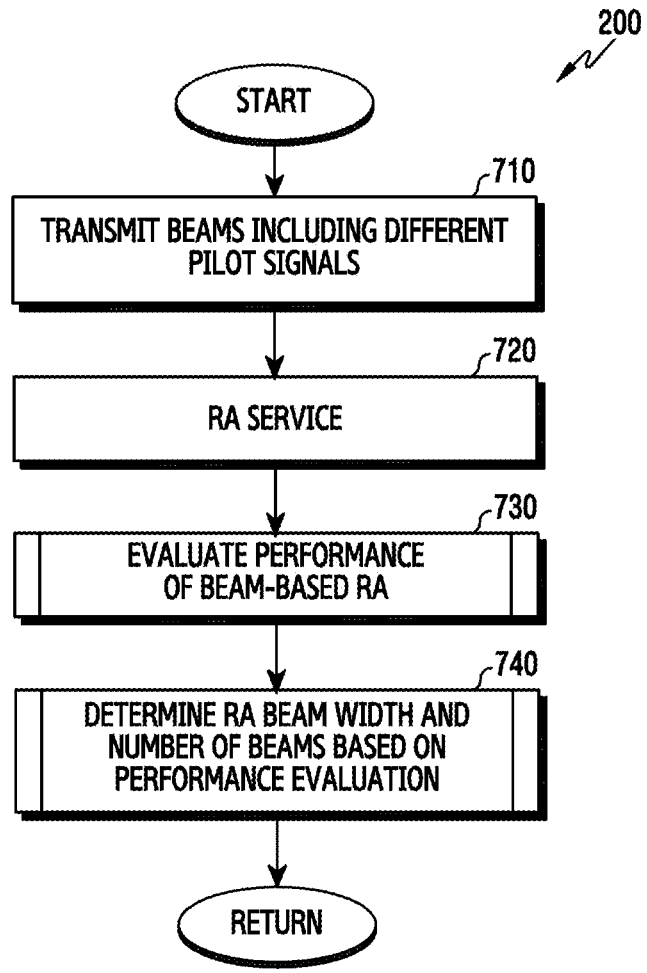
FIG. 7 is a flowchart illustrating the overall operation of a base station in non-overlapping beam-based random access according to an embodiment of the present disclosure.

FIG. 7 is a flowchart illustrating the overall operation of the base station 200 in non-overlapping beam-based random access according to an embodiment of the present disclosure.

Referring to FIG. 7, the base station 200 may transmit random-access resource information to terminals within a coverage area. Here, the transmitted random-access resource information may be information generated by the generating unit 320 of the communication-processing unit 220. The random-access resource information may include both beam-based random-access resource information and normal random-access resource information. Also, since the random-access resource information needs to be transmitted to all terminals within the coverage area, the base station may transmit the random-access resource information through a broadcasting channel. The terminals may receive and store the random-access resource information.

The base station 200 may form a plurality of beams to enable the terminals (e.g., the terminal 400 or the like) within the coverage area to perform multiple access in different directions (locations). The base station 200 may generate a plurality of beams having different directionalities (directions), and includes different pilot signals in the generated beams, respectively, in operation 710. A pilot signal included in a transmission beam may be a signal which is generated by the generating unit 320 of the communication-processing unit 220, and is allocated and mapped to each beam by the allocating and mapping unit 330. Also, the base station 200 may transmit a normal beam signal (e.g., an omni-directional signal that does not have directionality) which enables a terminal to attempt normal random access.

The terminals located within the coverage area of the base station 200 may attempt random access when uplink synchronization with the base station 200 is required. In this instance, the base station 200 transmits signals by forming a plurality of beams in different directions. In response to the same, the terminals receive beams including different pilot signals according to their locations. That is, the plurality of terminals performs multiple access to the base station 200, and the terminals which gain multiple access may receive different pilot signals. The terminal analyzes a signal received at its location. According to the analysis result, the terminal may attempt random access using previously stored beam-based random-access resource information or normal random-access resource information. The base station 200 may service random access by terminals in operation 720. In this instance, although terminals using different beams simultaneously attempt random access using the same resource, the base station may service random access of corresponding terminals without collision. The base station 200 may store a random-access resource of successful random access in the storage unit 230.

Subsequently, the base station 200 may evaluate the performance of beam-based random access based on the random-access resource of the successful random access in operation 730. That is, the base station 200 may analyze a service ratio of beam-based random access to normal random access, and may evaluate the performance of random access attempted in each beam. The performance evaluation of the beam-based random access may be performed by the performance evaluation unit 350 of the communication-processing unit 220.

After evaluating the performance, the base station 200 determines a beam width and the number of beams to be used for random access in the future based on the performance evaluation in operation 740. The beam width and the number of beams may be determined by the beam-determining unit 360 of the communication-processing unit 220.

Subsequently, when it is determined that terminals perform random access, the base station 200 transmits beams according to the determined beam width and the number of beams.

Through the operation of the base station illustrated in FIG. 7, the number of terminals performing beam-based random access and the number of terminals that successfully perform beam-based random access may be increased.

Figure 8:
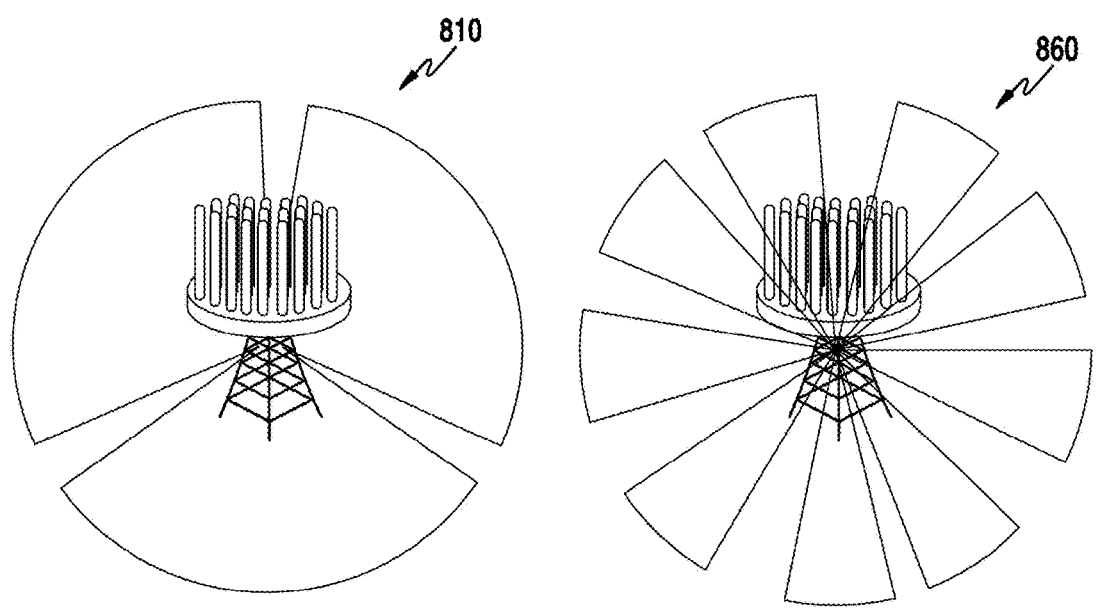
FIG. 8 is a diagram illustrating a base station that transmits non-overlapping beams according to an embodiment of the present disclosure.

FIG. 8 is a diagram illustrating the base station 200 that transmits non-overlapping beams according to an embodiment of the present disclosure.

Referring to FIG. 8, the base station 200 may transmit three wide beams without overlapping, as shown in the diagram 810, and may transmit nine narrow beams without overlapping, as shown in the diagram 860.

As shown in the diagram 810, when the base station 200 transmits three wide beams, the beam area occupies most of the coverage area of the base station 200, whereby a large number of terminals is capable of joining beam-based random access. However, the number of identical random-access resources that the base station 200 is capable of distinguishing is limited to three, whereby the probability of successful random access by a terminal may be lower than the case of using narrow beams (the diagram 860).

As shown in the diagram 860, when the base station 200 transmits nine narrow beams, the beam area is narrow, whereby a relatively small number of terminals (e.g., compared to the case of the diagram 810) is capable of joining beam-based random access. However, the number of identical random-access resources that the base station 200 is capable of distinguishing is nine, whereby the probability of successful random access by a terminal may be higher than the case of using wide beams (the diagram 810).

Figure 9A:
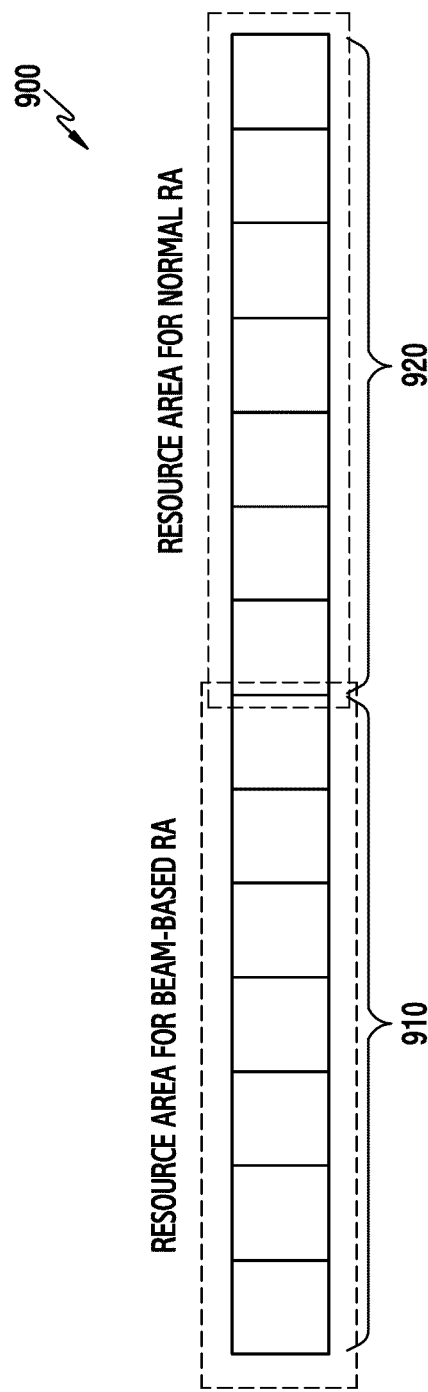
FIG. 9A is a diagram illustrating random-access resources according to an embodiment of the present disclosure.

FIG. 9A is a diagram illustrating random-access resources according to an embodiment of the present disclosure. The number of bits of a random-access resource and the classification of a resource area and the like, illustrated in FIG. 9, are merely for illustrative purposes, and various modifications are possible without departing from the scope of the present disclosure.

Referring to FIG. 9a, a random-access resource 900 may include a beam-based random-access resource 910 and a normal random-access resource 920.

The beam-based random-access resource 910 may be used by a terminal that performs beam-based random access. Conversely, the normal random-access resource 920 may be used by a terminal that is incapable of performing multiple access-based random access. The base station 200 may detect the random-access resource 900 through the extraction and detection unit 340.

The base station 200 may utilize the detected random-access resource 900 to evaluate random-access performance as described below.

The base station 200 may compare the number of terminals that utilize the beam-based random-access resource 910 and the number of terminals that utilize the normal random-access resource 920 so as to calculate the ratio of terminals joining the beam-based random access. Also, the base station 200 may calculate the ratio of terminals that do not perform random access due to collisions from among terminals that use the beam-based random access resource 910. Subsequently, the base station 200 may evaluate the performance of beam-based random access by appropriately combining the ratio of terminals performing beam-based random access and the ratio of terminals that do not perform random access.

Figure 9B:
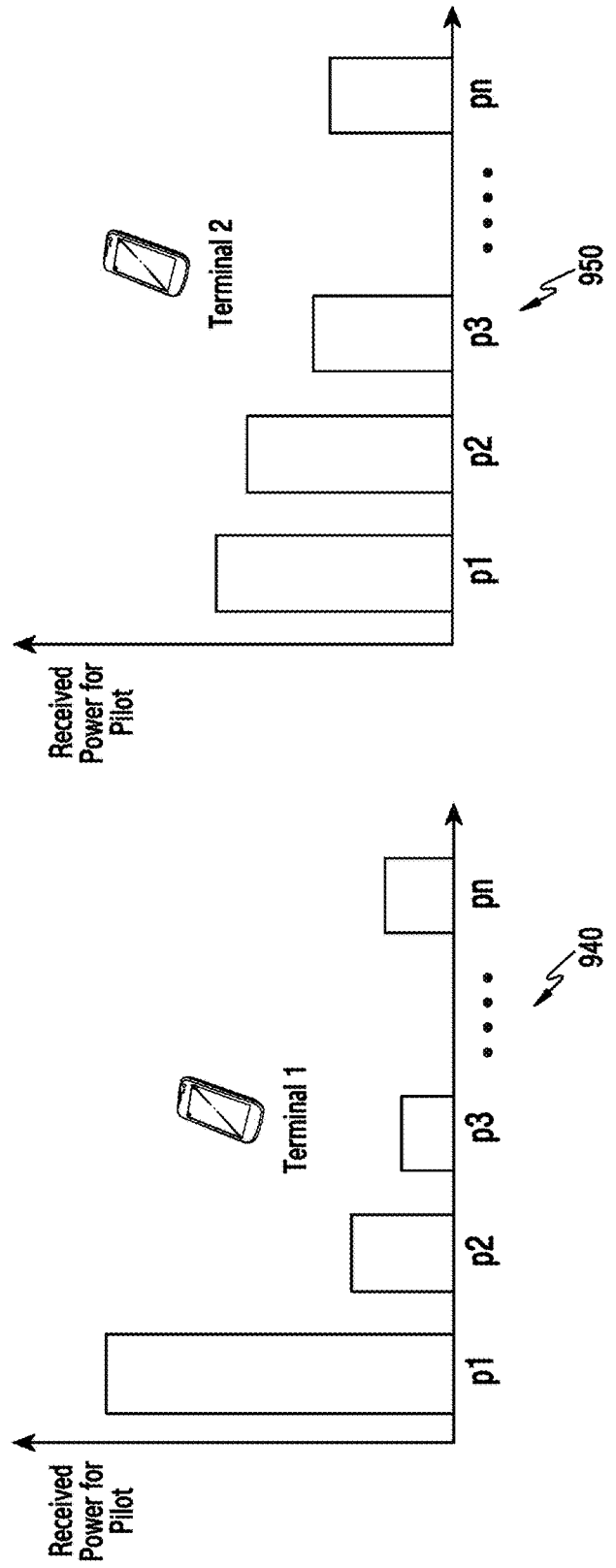
FIG. 9B illustrates graphs of the reception strengths of pilot signals received by terminals according to an embodiment of the present disclosure.

FIG. 9b illustrates graphs of the reception strengths of pilot signals received by terminals according to an embodiment of the present disclosure.

Referring to FIG. 9b, graphs 940 and 950 show reception strengths of pilots received by a terminal that performs random access.

Terminal 1 and Terminal 2 of the graphs 940 and 950 may perform the functions of the terminal 400.

In the graph 940, terminal 1 receives pilot signal P1 with strong strength and receives pilot signals P2 to Pn with weak strength. That is, terminal 1 may be a terminal located in a beam area where P1 is included (in other words, an environment having low interference of beams where P2 to Pn are included). Therefore, terminal 1 may be a terminal that satisfies a beam-based random-access joining condition, and may perform random access using the beam-based random-access resource 910.

In graph 950, terminal 2 receives pilot signals P1 to Pn with similar strengths. That is, the terminal 2 may be located in the outer side of the beam area, or may be located in a beam area boundary (in other words, an environment having high interference of beams where P2 to Pn are included). Therefore, the terminal 2 may not perform multiple access-based random access, and may perform random access using the normal random-access resource 920.

Figure 10:
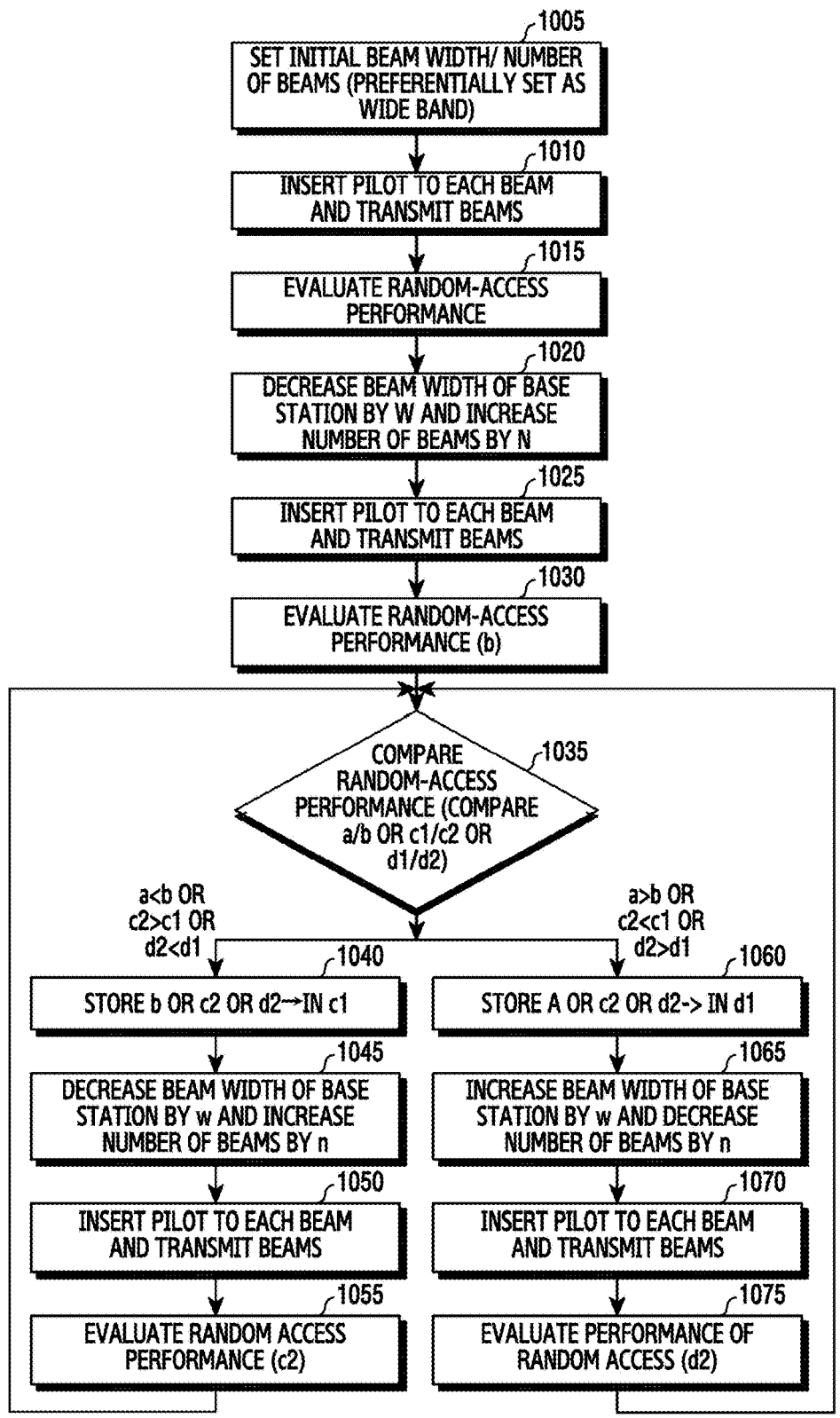
FIG. 10 is a flowchart illustrating the operation of a base station in non-overlapping beam-based random access according to an embodiment of the present disclosure.

FIG. 10 is a flowchart illustrating the operation of the base station 200 in non-overlapping beam-based random access according to an embodiment of the present disclosure.

Referring to FIG. 10, the base station 200 may set an initial beam width and the number of beams in operation 1005. The initial beam width may be set to be wide (accordingly, the number of beams may be decreased). This is because a larger number of terminals can perform beam-based random access as the beam width is wide, as shown in the diagram 810.

Subsequently, the base station 200 may transmit a pilot signal by inserting the pilot signal for each set beam in operation 1010. When the terminal performs random access in response thereto, the base station 200 may evaluate the performance of beam-based random access (hereinafter referred to as A) in operation 1015. Subsequently, the base station 200 may decrease the beam width (accordingly, the number of beams increases) in operation 1020. This is because the initial beam width is preferentially set to be wide in operation 1005.

Subsequently, the base station 200 may transmit a pilot signal by inserting the pilot signal for each beam that has been narrowed in operation 1025. Subsequently, when the terminal performs random access in response thereto, the base station 200 may evaluate the performance of beam-based random access (hereinafter referred to as B) in operation 1030.

When the performance evaluation is finished in operation 1030, the base station 200 may compare A and B in operation 1035.

When B is better than A, the base station 200 may store B in the storage unit 230 (hereinafter referred to as C1) in operation 1040. Subsequently, the base station 200 may decrease the beam width (accordingly, the number of beams increases) in operation 1045. Next, the base station 200 performs operation 1050, and operation 1050 may correspond to operation 1025. The base station 200 evaluates the performance of beam-based random access (hereinafter referred to as C2) in operation 1055. Subsequently, the base station 200 may compare C1 and C2 in operation 1035.

When A is better than B, the base station 200 may store A in the storage unit 230 (hereinafter referred to as D1) in operation 1060. Subsequently, the base station 200 may increase the beam width (accordingly, the number of beams decreases) in operation 1065. Next, the base station 200 performs operation 1070, and operation 1070 may correspond to operation 1025. The base station 200 may evaluate the performance of beam-based random access (hereinafter referred to as D2) in operation 1075. Subsequently, the base station 200 may compare D1 and D2 in operation 1035.

That is, the base station 200 repeatedly performs operations 1035 and 1075, and determines an optimal beam width and the number of beams for performing random access.

Figure 11:
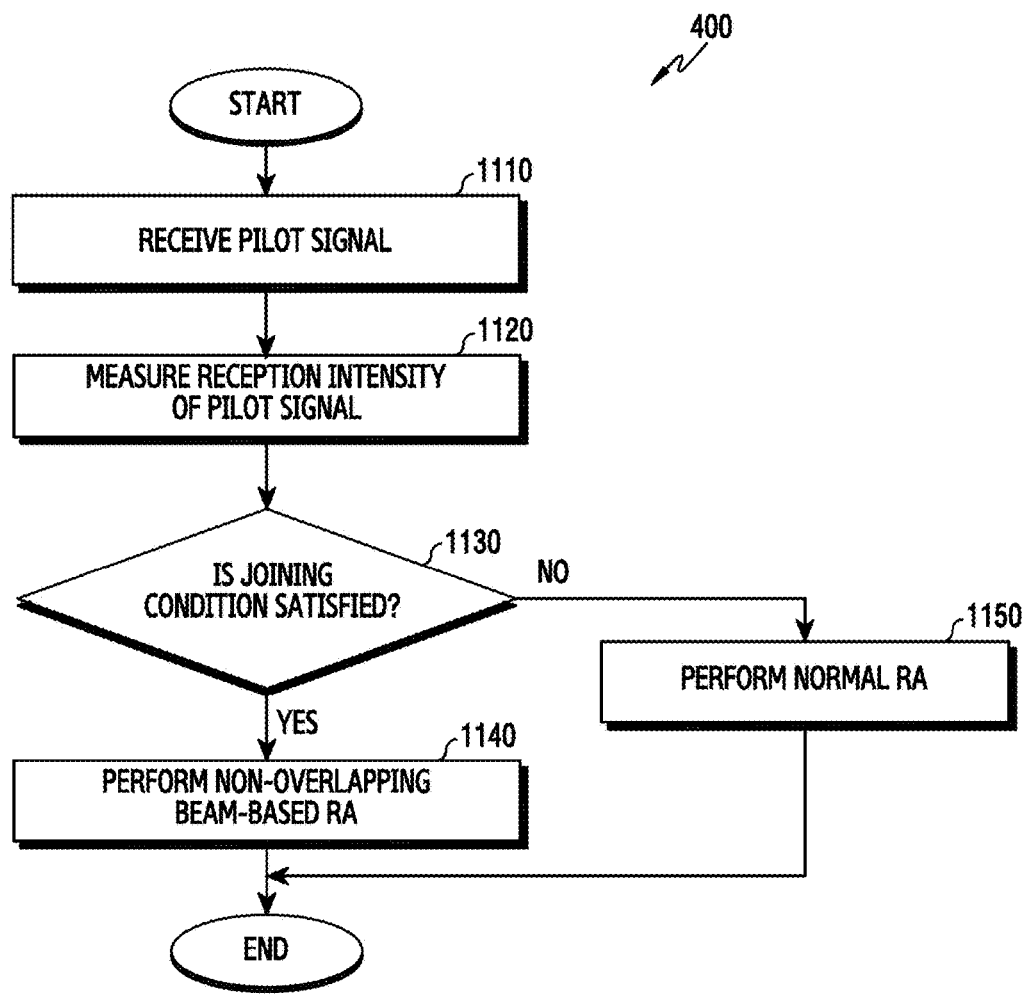
FIG. 11 is a flowchart illustrating the operation of a terminal that performs random access according to an embodiment of the present disclosure.

FIG. 11 is a flowchart illustrating the operation of a terminal that performs random access according to an embodiment of the present disclosure.

Referring to FIG. 11, a base station may transmit resource information to be used for terminals to perform random access. Here, the resource information may be beam-based random-access resource information and normal random-access resource information. Terminals may download and store the random-access resource information. Also, the base station 200 may service non-overlapping beam-based random access, as illustrated in FIG. 8. That is, the base station 200 may transmit signals by forming a plurality of beams in different directions, and may include different pilot signals in the beams, respectively.

When uplink synchronization with the base station 200 is required, the terminal 400 may attempt random access to the base station 200. The terminal 400 may receive downlink signals through the antenna 450 in operation 1110. The terminal 400 may measure the reception strengths of the received pilot signals in operation 1120. In this instance, the signal received by the terminal may be a beam signal formed in a predetermined direction or may be a normal beam signal (e.g., an omni-directional signal). The beams may include different pilot signals, respectively. Therefore, the terminal may receive a single pilot signal or a plurality of pilot signals according to its location. The reception strengths of the received pilot signals are different from each other. For example, when a terminal is located in a boundary of areas where different beams are formed, the corresponding terminal may receive different pilot signals having similar reception strengths. When a terminal is located in a predetermined beam area, the corresponding terminal may receive a pilot signal included in the corresponding beam area with a strong strength.

Subsequently, the terminal 400 may determine whether to join beam-based random access based on the measured reception strengths of the pilot signals in operation 1130. When the strength of a pilot signal included in a predetermined beam is stronger than the strengths of pilot signals included in other beams (i.e., interference from other beams is low), the terminal 400 may perform non-overlapping beam-based random access in operation 1140. Unlike the above, when the strength of a pilot signal included in a predetermined beam is similar to the strengths of pilot signals included in other beams (i.e., interference from other beams is high), the terminal 400 may perform normal random access in operation 1150.

As described above, a terminal may attempt random access according to a beam received at its location. In this instance, the terminal may analyze the strength of a received pilot signal and perform random access by selecting non-overlapping beam-based random access or normal random access. When non-overlapping beam-based random access is performed, a plurality of terminals that receive different beams may gain multiple access and attempt random access using the same resource.

Figure 12:
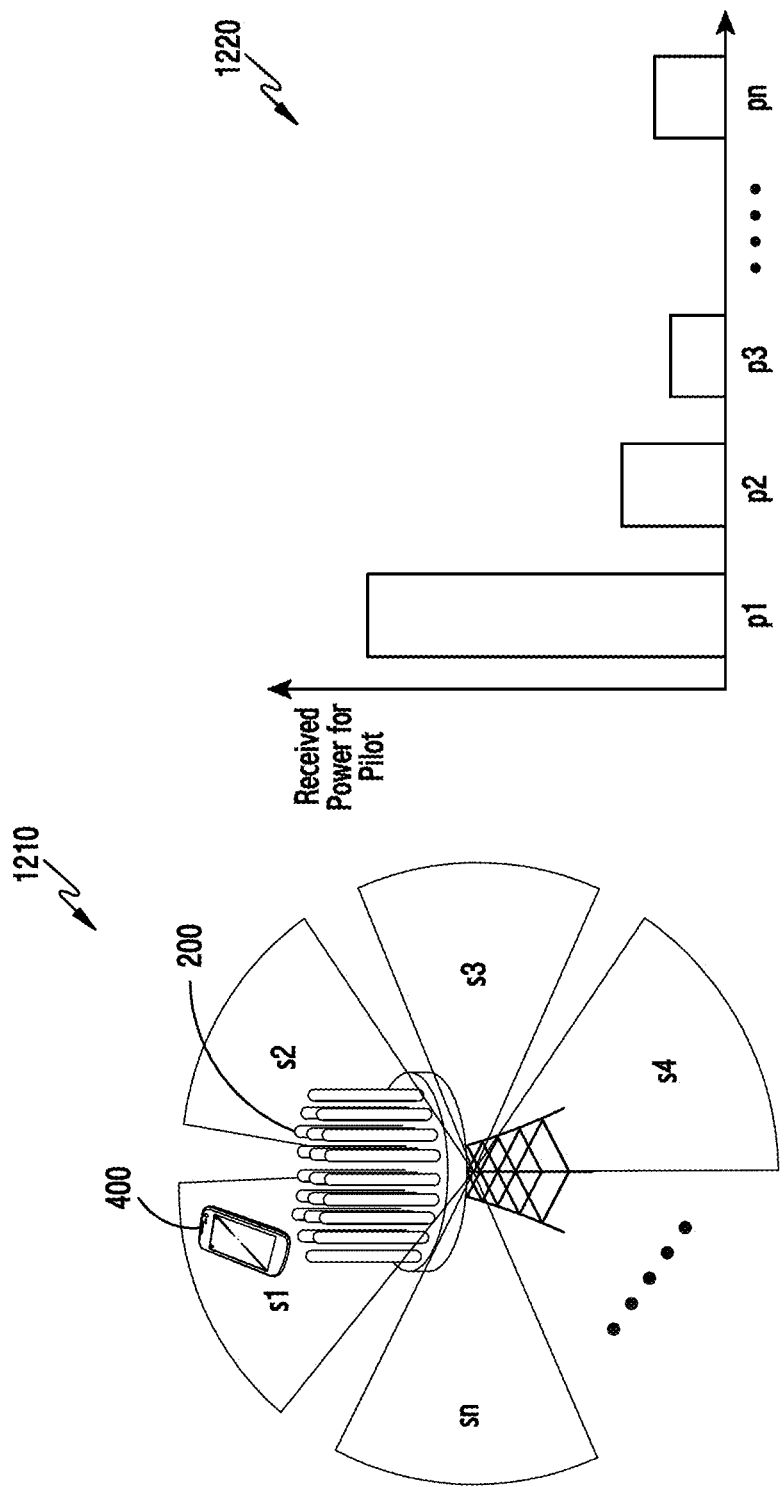
FIG. 12 is a diagram illustrating a terminal that determines whether to join non-overlapping beam-based random access and a base station corresponding thereto, according to an embodiment of the present disclosure.

FIG. 12 is a diagram illustrating a terminal that determines whether to perform non-overlapping beam-based random access and a base station corresponding thereto according to an embodiment of the present disclosure.

Referring to FIG. 12, the diagram 1210 illustrates the terminal 400 located in the area of beam S1, and the graph 1220 illustrates the strength of a pilot signal received by the terminal 400.

As shown in the diagram 1210 and the graph 1220, when the terminal 400 is located in the area of beam S1, the reception strength of the pilot signal P1 received by the terminal 400 may be stronger than the reception strengths of other pilot signals (e.g., P2, P3, . . . , and Pn). When the difference in reception strengths between the pilot signal P1 and other pilot signals (e.g., P2, P3, . . . , and Pn) satisfies a predetermined condition, the terminal 400 may determine to join beam-based random access. Here, the predetermined condition is one of the following conditions.

First, a condition (first condition) is that a pilot signal having the maximum signal strength exists among pilot signals received by the terminal 400. In this instance, the number of terminals that satisfy a beam-based random-access joining condition may be increased. However, when the difference in reception strengths between a pilot signal having the strongest strength and the remaining pilot signals is low, the base station 200 may have difficulty in distinguishing a random-access resource for each beam due to interference among the beams.

Second, a condition (second condition) is that a pilot signal having the maximum signal strength among pilot signals received by the terminal 400 is greater than the sum of strengths of the remaining pilot signals. In this instance, the number of terminals that satisfy the second condition may be smaller than the number of terminals that satisfy the first condition. However, since the difference in reception strengths between the pilot signal having the maximum strength and the remaining pilot signals is high, the base station 200 may easily distinguish a random-access resource for each beam.

Third, a condition (third condition) is that a pilot signal having the maximum signal strength among pilot signals received by the terminal 400 is greater than or equal to a threshold value, and the strengths of the remaining pilot signals are less than the threshold value. In this instance, the number of terminals that satisfy a beam-based random-access joining condition may be increased. However, when the difference in reception strengths between a pilot signal having the maximum strength and the remaining pilot signals is low, the base station 200 may have difficulty in distinguishing a random-access resource for each beam due to interference among the beams.

Fourth, a condition (fourth condition) is that a pilot signal having the maximum signal strength among pilot signals received by the terminal 400 is greater than or equal to a threshold value, and the sum of the reception strengths of the remaining pilot signals is less than the threshold value. In this instance, the number of terminals that satisfy the fourth condition may be smaller than the number of terminals that satisfy the third condition. However, since the difference in reception strengths between the pilot signal having the maximum strength and the remaining pilot signals is high, the base station 200 may easily distinguish a random-access resource for each beam.

The terminal 400 may flexibly select a condition from the above-described conditions according to a communication environment, and may determine whether to perform non-overlapping beam-based random access. The terminal 400 may determine whether to perform non-overlapping beam-based random access based on other methods excluding the above-described four conditions.

Figure 13:
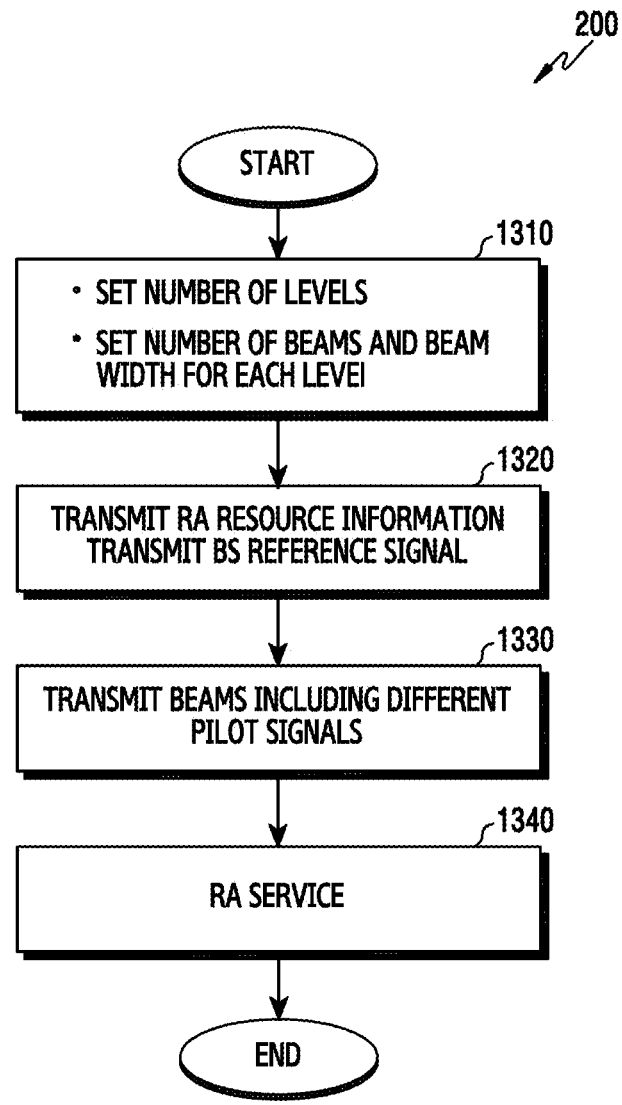
FIG. 13 is a flowchart illustrating the operation of a base station in overlapping beam-based random access according to an embodiment of the present disclosure.

FIG. 13 is a flowchart illustrating the operation of a base station in overlapping-beam-based random-access according to an embodiment of the present disclosure.

Referring to FIG. 13, the base station 200 may service overlapping beam-based random access. The base station 200 may set level information and set a beam width, the number of beams, and a beam gain according to the set level in operation 1310. The level information may be information that sets beam sections that overlap in the coverage area of the base station 200. For example, a terminal may be located close to the base station or may be located far from the base station. The base station may form beams in different levels to communicate with terminals located close to and far from the base station, respectively. The base station 200 may divide the distance of the coverage area into a plurality of sections, and may form beams so as to communicate with terminals, which are respectively located in the divided sections, in different levels. In this instance, beams formed in a section having a low level may overlap beams formed in a section having a high level. When the number of levels is set, the base station 200 may set a beam width for each level and a beam gain of a corresponding beam. The level information may be set by the generating unit 320 of the communication-processing unit 220. For example, as shown in FIG. 6, the base station 200 may set a beam width to be different for each level.

Subsequently, the base station 200 may transmit random-access resource information including level information and a base-station reference signal in operation 1320. Here, the random-access resource information may include level information, preamble information, and the like.

The base station 200 may transmit signals by forming corresponding beams according to the set level and beam width in operation 1330. The base station 200 may include different pilot signals in the formed beams, respectively. In this instance, when beams having a plurality of levels are formed, the beams may overlap in a partial area. For example, a beam having level 2 may be transmitted further than a beam having level 1, and may have a narrower beam width. In this instance, the beam having level 2 may overlap a partial area where the beam having level 1 is formed. The base station 200 may include different pilot signals in the formed beams based on their levels, respectively. Therefore, the terminals may receive overlapping beam signals or non-overlapping beam signals when performing random access. When the terminal receives overlapping beam signals, the terminal may analyze pilot signals and determine an overlapping beam-based random access joining condition. In operation 1330, the base station transmits a different pilot signal for each beam, and thus the terminal that receives the pilot signals may recognize a set of beams with low interference. Upon completion of operation 1330, the base station 200 services random access. In operation 1330, the base station 200 may service overlapping beam-based random access. In this instance, when random access is required, the terminal measures a base-station reference signal to recognize the level to which the terminal belongs and measures a pilot signal so as to attempt random access.

Figure 14:
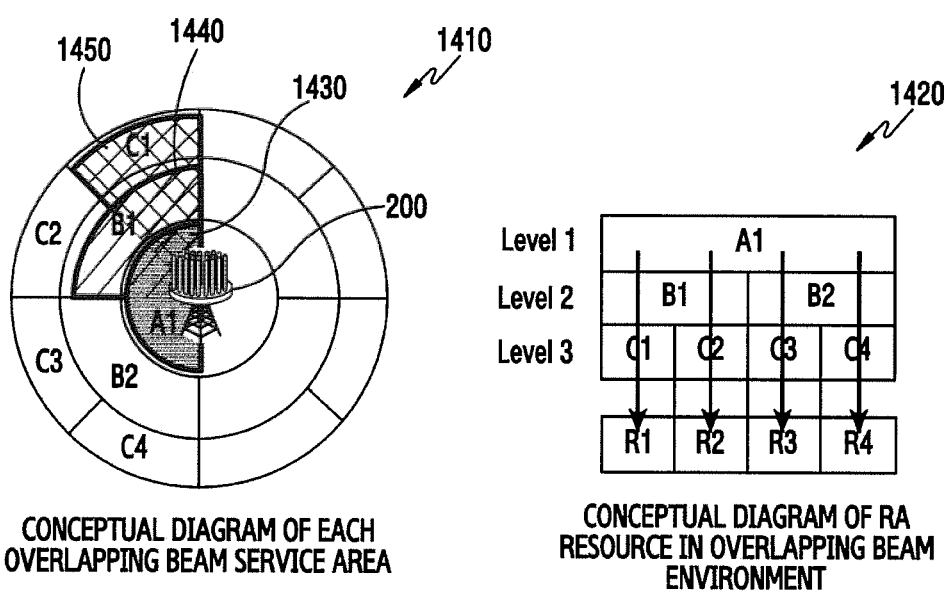
FIG. 14 illustrates conceptual diagrams of overlapping beams according to an embodiment of the present disclosure.

FIG. 14 illustrates conceptual diagrams of overlapping beams according to an embodiment of the present disclosure.

Referring to FIG. 14, the diagram 1410 is a conceptual diagram of a service area for each overlapping beam in an environment including three levels, and the diagram 1420 is a conceptual diagram of a random-access resource in an overlapping beam environment divided into three levels.

Beam A1 may provide service to a terminal in an area 1430 without interference. Beam B1 may provide service to a terminal in an area 1440 without interference. Beam C1 may provide service to a terminal in an area 1450 without interference.

Referring to the diagram 1420, resources allocated to the beam A1 may be R1 to R4. Resources allocated to the beam B1 may be R1 and R2, and resources allocated to the beam B2 may be R3 and R4. A resource allocated to beam C1 may be R1, a resource allocated to beam C2 may be R2, a resource allocated to beam C3 may be R3, and a resource allocated to beam C4 may be R4. That is, unlike the resources R3 and R4, resources R1 and R2 may overlap in some cases when random access is performed. Accordingly, various embodiments of the present disclosure may propose two methods so as to control random access of terminals existing in areas (e.g., areas 1430 to 1450) in a similar direction in an overlapping beam environment.

First is a partial contention scheme. A terminal that performs overlapping beam random access according to the partial contention scheme may select a random-access resource by taking into consideration a resource to be used by a terminal in a level subsequent to the level of the corresponding terminal. For example, a terminal located in the area 1430 may perform random access using, as a resource, one of resources R3 and R4, as opposed to resources R1 and R2, which may be used by a terminal located in the area 1440. That is, when the random access is performed based on the partial contention scheme, terminals may evenly perform successful random access without collision.

Second is an entire contention scheme. A terminal that performs overlapping beam random access according to the entire contention scheme may select an optimal random access resource in a level corresponding to the terminal. For example, a terminal located in the area 1430 may perform random access by selecting an optimal resource, R1, without taking into consideration a terminal located in the area 1440. The partial contention scheme and the entire contention scheme in the overlapping beam environment will be described in detail in the following description associated with the drawings.

Figure 15:
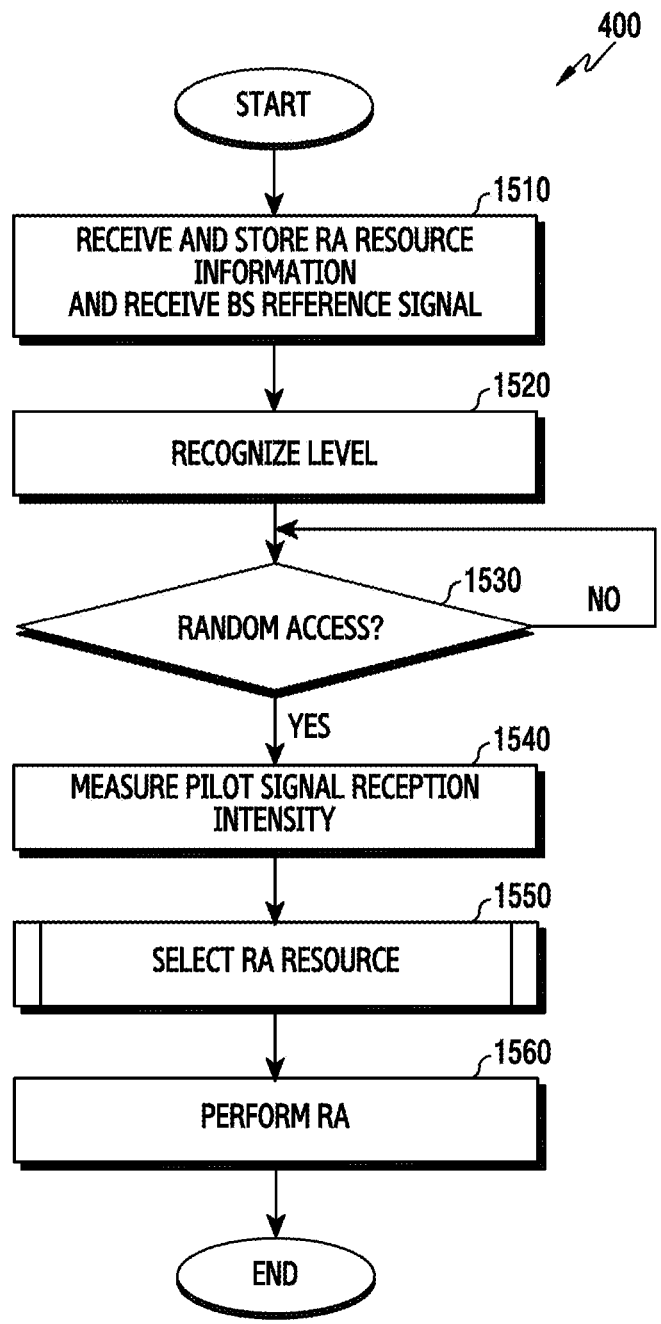
FIG. 15 is a flowchart illustrating the operation of a terminal that performs overlapping beam-based random access according to an embodiment of the present disclosure.

FIG. 15 is a flowchart illustrating the operation of a terminal that performs overlapping beam-based random access according to an embodiment of the present disclosure.

Referring to FIG. 15, the terminal 400 receives random-access resource information and a base-station reference signal in operation 1510. The terminal 400 may store the random-access resource information to utilize the same when performing random access.

Subsequently, the terminal 400 may recognize its level in operation 1520. Particularly, the terminal 400 may compare level information included in the random-access resource information with the reception strength of the base-station reference signal so as to recognize its own level. For example, the terminal 400 located in the area 1430 may recognize its level as level 1, the terminal located in the area 1440 may recognize its level as level 2, and the terminal 400 located in the area 1450 may recognize its level as level 3. The level recognized by the terminal 400 may be a reference for selecting a random-access resource in the following procedure.

Upon completion of recognizing the level, the terminal 400 may determine whether to perform random access in operation 1530. When the terminal 400 determines to perform random access, the terminal 400 may measure the reception strength of a pilot signal of each beam in operation 1540.

Subsequently, the terminal 400 may select a random-access resource in operation 1550. Here, the method of selecting a random-access resource may be different depending on the contention scheme (e.g., whether a partial contention scheme or a total contention scheme is used).

Subsequently, the terminal 400 may perform random access using the selected random-access resource in operation 1560.

Figure 16A:
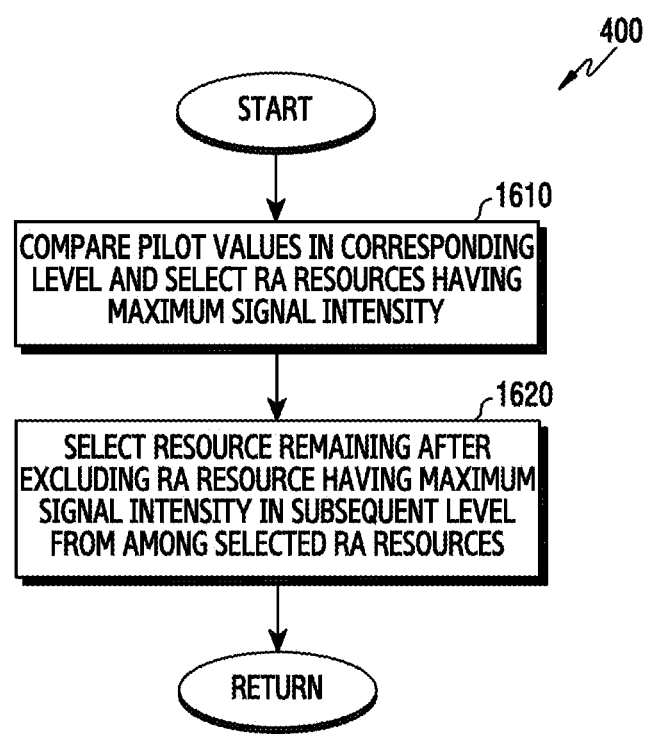
FIGS. 16a and 16b are flowcharts illustrating the operation of a terminal that selects a random-access resource according to an embodiment of the present disclosure.
Figure 16B:
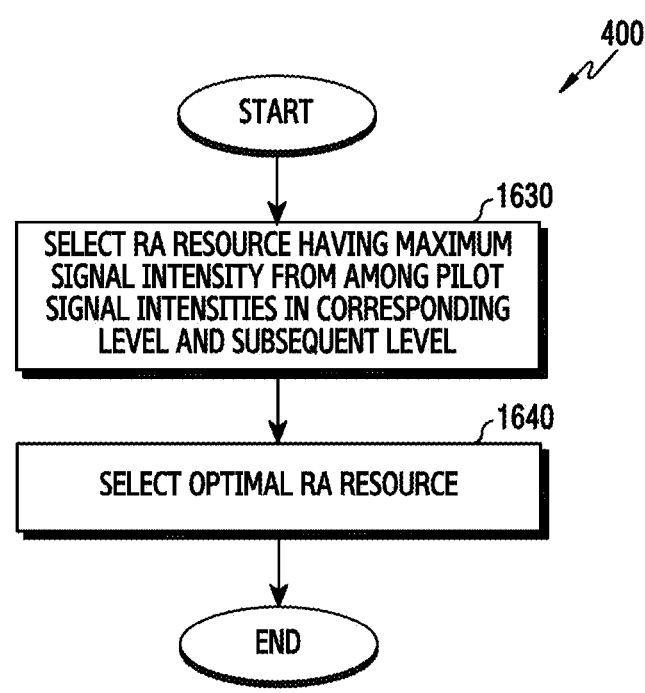

FIGS. 16*a* and 16*b* are flowcharts illustrating the operation of a terminal that selects a random-access resource according to an embodiment of the present disclosure. Particularly, FIG. 16*a* is a flowchart illustrating the operation of a terminal for selecting a random-access resource according to a partial contention scheme, and FIG. 16*b* is a flowchart illustrating the operation of a terminal for selecting a random-access resource according to an entire contention scheme.

Referring to FIG. 16*a*, the terminal 400 may select random-access resources of a beam pattern including a pilot signal having a strong reception strength from among beam patterns corresponding to the level of the terminal 400 in operation 1610. For example, when the terminal 400 is located in the area 1440, a pilot signal having the maximum reception strength may be one of a pilot signal of beam B1 and pilot signals included in beam C1 and beam C2. Therefore, the terminal 400 may select random-access resources R1 and R2 allocated to one of beam B1 and beams C1 and C2. Here, a condition for distinguishing a pilot signal having the maximum reception strength may be one of the above-described first through fourth conditions.

Subsequently, the terminal 400 may select an optimal resource from the resources remaining after excluding a resource to be used by a terminal located in a subsequent level from the resources selected by the terminal 400 in operation 1620. For example, the terminal 400 located in the area 1440 may select resource R2 by taking into consideration the fact that the terminal located in the subsequent level (e.g., a terminal located in the area 1450) may select resource R1.

Referring to FIG. 16*b*, the terminal 400 may select random-access resources of a beam pattern including a pilot signal having a strong reception strength from among beam patterns corresponding to the level of the terminal 400 in operation 1630. For example, when the terminal 400 is located in the area 1440, a pilot signal having the maximum reception strength may be one of a pilot signal of beam B1 and pilot signals included in beam C1 and beam C2. Therefore, the terminal 400 may select random-access resources R1 and R2 allocated to one of beam B1 and beams C1 and C2.

Subsequently, the terminal 400 may select an optimal random-access resource in operation 1640. That is, when the terminal 400 belongs to the area 1440, the terminal 400 may select random-access resource R1, which enables the fastest random access.

In summary, the partial contention scheme enables a large number of terminals to simultaneously perform random access, and the entire contention scheme enables predetermined terminals to efficiently join random access. That is, the partial contention scheme and the entire contention scheme are not in a mutually exclusive relationship but may be in a supplementary relationship.

For example, when a large number of terminals is located in the same direction, although having different levels, the terminal 400 may perform overlapping beam-based random access according to the entire contention scheme. This is because a collision cannot help but happen with at least a predetermined probability even though overlapping beam-based random access is performed according to the partial contention scheme.

Unlike the above, when a large number of terminals is located in different directions, the terminal 400 may perform overlapping beam-based random access according to the partial contention scheme. This is because only a few terminals are allowed to perform overlapping beam-based random access when random access is performed according to the entire contention scheme.

Figure 17:
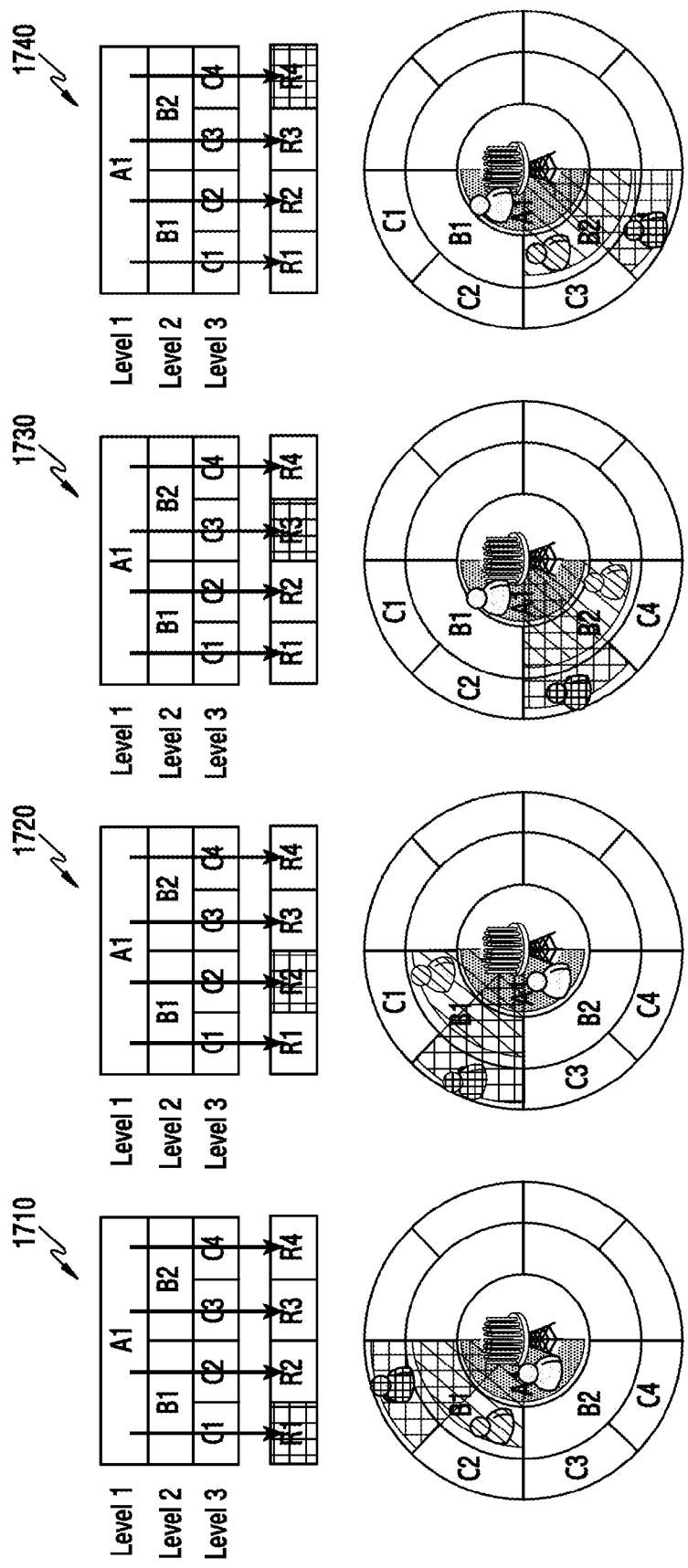
FIG. 17 is a diagram illustrating terminals that perform random access in a partial contention-based scheme and resource distributions corresponding thereto, according to an embodiment of the present disclosure.

FIG. 17 is a diagram illustrating terminals that perform random access in the partial contention scheme and resource distributions corresponding thereto according to an embodiment of the present disclosure.

Referring to FIG. 17, diagrams 1710 to 1740 illustrate random-access resource selection schemes of terminals in three levels and three directions, respectively.

In the case of the diagram 1710, a terminal located in the area of beam C1 may select resource R1, a terminal located in the area of beam B1 may select resource R2, and a terminal located in the area of beam A1 may select resource R3 (R3 enabling fast random access among resources R3 and R4).

In the case of the diagram 1720, a terminal located in the area of beam C2 may select resource R2, a terminal located in the area of beam B1 may select resource R1, and a terminal located in the area of beam A1 may select resource R3 (R3 enabling fast random access among resources R3 and R4).

In the case of the diagram 1730, a terminal located in the area of beam C3 may select resource R3, a terminal located in the area of beam B2 may select resource R4, and a terminal located in the area of beam A1 may select resource R1 (R1 enabling fast random access among resources R1 and R2).

In the case of the diagram 1740, a terminal located in the area of beam C4 may select resource R4, a terminal located in the area of beam B2 may select resource R3, and a terminal located in the area of beam A1 may select resource R1 (R1 enabling fast random access among resources R1 and R2).

That is, in the partial contention scheme, each of the terminals may select random-access resources without overlapping, thereby successfully performing random access without collisions.

Figure 18:
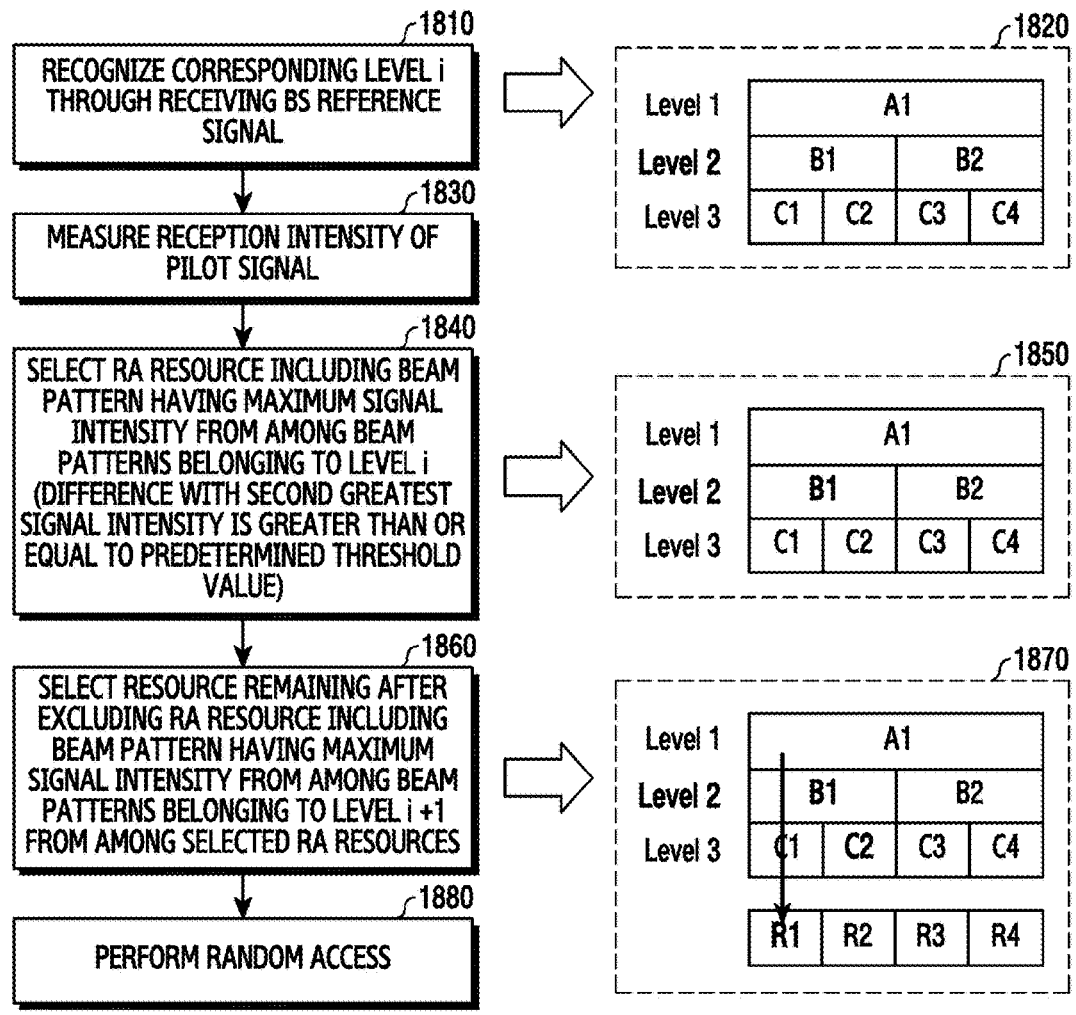
FIG. 18 illustrates a flowchart of the operation of a terminal in a partial contention scheme and random-access resource conceptual diagrams according to an embodiment of the present disclosure.

FIG. 18 illustrates a flowchart of the operation of a terminal in a partial contention scheme and a random-access resource conceptual diagram according to an embodiment of the present disclosure.

Referring to FIG. 18, the terminal 400 recognizes its level based on received level information and base-station reference signal strength in operation 1810. For example, in the diagram 1820, the terminal 400 may recognize its level as level 2.

Subsequently, the terminal 400 may measure the reception strength of a pilot signal in operation 1830.

Subsequently, the terminal 400 may select a random-access resource including beam patterns having a pilot signal having the maximum reception strength in operation 1840. For example, in the diagram 1850, the terminal 400 may select random-access resources R1 and R2, corresponding to one of beam B1 and beams C1 and C2 which have the maximum pilot signal strength.

Subsequently, the terminal 400 may select, from the selected random-access resources, the resource remaining after excluding a random-access resource including a beam pattern having the maximum pilot signal strength from among beam patterns belonging to a subsequent level. For example, in the diagram 1870, the terminal 400 may select random-access resource R1, excluding random-access resource R2 included in beam C2 of level 3.

Subsequently, the terminal 400 may perform random access using the selected random-access resource in operation 1880.

Figure 19:
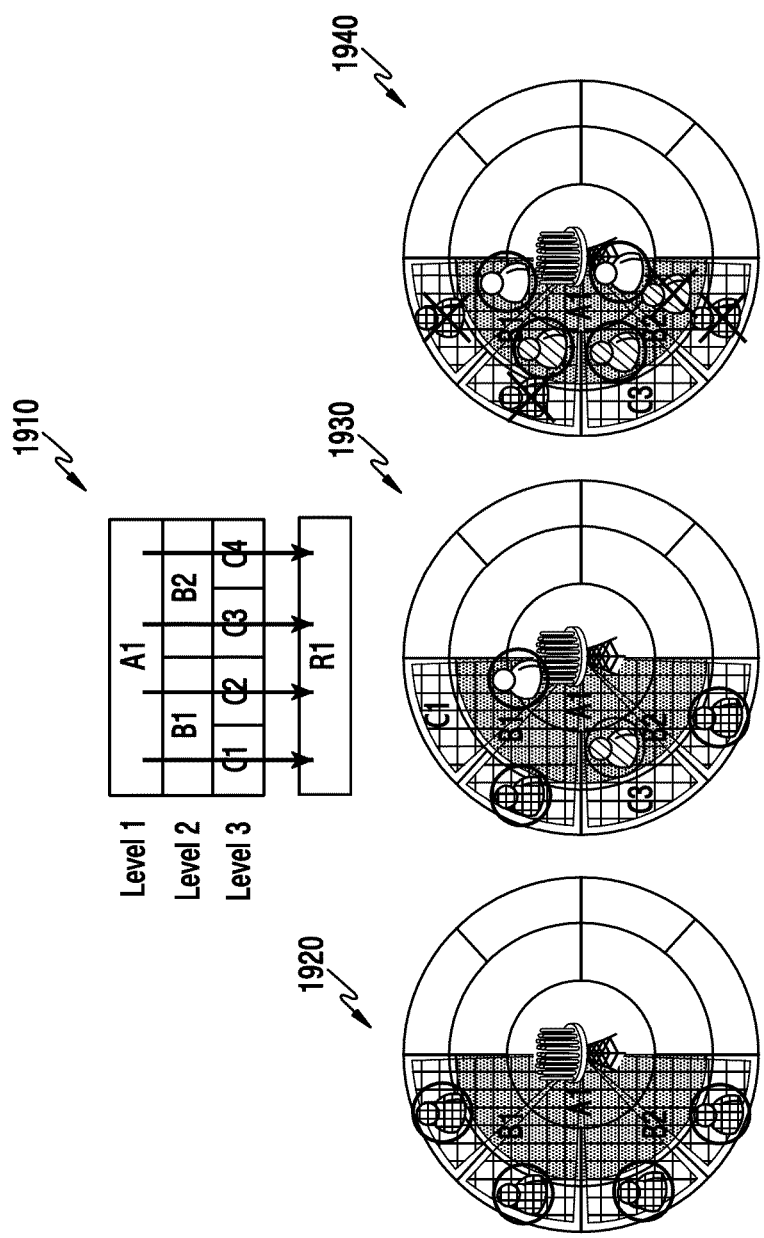
FIG. 19 is a diagram illustrating terminals that perform random access in an entire contention scheme and resource distributions corresponding thereto, according to an embodiment of the present disclosure.

FIG. 19 is a diagram illustrating terminals that perform random access in an entire contention-based scheme and resource distributions corresponding thereto according to an embodiment of the present disclosure.

Referring to FIG. 19, terminals in diagrams 1920 to 1940 may perform random access by utilizing random-access resource R1, as shown in diagram 1910.

In diagram 1920, terminals belong to different beams, respectively, whereby the terminals are capable of utilizing a single random-access resource R1 without collision.

In the diagram 1930, although terminals located in respective areas have different levels, the terminals belong to different beams, respectively, whereby the terminals are capable of utilizing a single random-access resource R1 without collision.

In the diagram 1940, terminals having different levels are located in various directions. In this instance, a collision cannot help but happen even though overlapping beam-based random access is performed according to the partial contention scheme. In this instance, it is efficient to preferentially perform random access of terminals having low levels in each direction according to the entire contention scheme, and, upon completion of successful random access thereof, to retry random access for others.

As described above, a method of a base station according to various embodiments of the present disclosure may include: evaluating the performance of beam-based random access; determining a beam width and the number of beams of random access based on the performance evaluation; forming the determined beams; and allocating different pilot signals to the beamforming signals, respectively, and transmitting the same.

The operation of evaluating the performance evaluates the performance of beam-based random access based on the number of terminals that perform beam-based random access, and the operation of determining the beam width and the number of beams controls a beam width and the number of beams based on the number of terminals that perform beam-based random access.

The operation of evaluating the performance further includes an operation of evaluating the performance of beam-based random access based on the number of terminals that experience collisions from among the terminals that perform beam-based random access, and the operation of determining the beam width and the number of beams controls a beam width and the number of beams based on the number of terminals that perform beam-based random access and the number of terminals that experience random-access collisions.

According to various embodiments of the present disclosure, the transmission operation may further include transmitting random-access resource information. The random-access resource information may include beam-based random-access resource information and normal random-access resource information.

The random-access resource information may further include level information. The operation of determining the beam width and the number of beams may further include determining gains of beams that overlap in at least a partial area of the determined beam width based on the level information. The transmission operation controls beamforming based on the beam width and the number of beams, and overlappingly transmits a beam to a beam area corresponding to the level.

A method of a base station according to various embodiments of the present disclosure includes: setting at least one level for overlapping of beams; transmitting random-access resource information and a base-station reference signal; determining gains of overlapping beams based on the level; and performing forming such that beams overlap according to the determined beam gains, allocating different pilot signals to the overlapping beams, and transmitting the same.

The random-access method of the base station may further include receiving beam-based random access information of a terminal, which is received through overlapping beam areas.

The random-access method of a terminal according to various embodiments of the present disclosure includes: receiving pilot signals; measuring reception strengths of pilot signals; determining whether to join beam-based random access based on the measured reception strengths; and attempting beam-based random access when the terminal determines to perform beam-based random access, and otherwise attempting normal random access.

According to various embodiments of the present disclosure, the operation of determining whether to perform beam-based random access determines to perform beam-based random access when a maximum value exists among the measured reception strengths of pilot signals.

According to various embodiments of the present disclosure, the operation of determining whether to perform beam-based random access determines to perform beam-based random access when the maximum reception strength of a pilot signal from among the measured reception strengths of the pilot signals is greater than the sum of the reception strengths of the remaining pilot signals.

According to various embodiments of the present disclosure, the operation of determining whether to perform beam-based random access may determine to perform beam-based random access when the maximum reception strength of a pilot signal from among the measured reception strengths of the pilot signals is greater than or equal to a predetermined threshold value and the reception strengths of the remaining pilot signals are less than or equal to the threshold value.

According to various embodiments of the present disclosure, the operation of determining whether to perform beam-based random access may determine to join beam-based random access when the maximum reception strength of a pilot signal from among the measured reception strengths of the pilot signals is greater than or equal to a predetermined threshold value and the sum of the reception strengths of the remaining pilot signals is less than or equal to the threshold value.

The method may further include receiving beam-based random-access resource information and normal random-access resource information from a base station, and may attempt to perform random access using the beam-based random-access resources when the terminal determines to perform beam-based random access, and otherwise may attempt to perform random access using the normal random-access resources.

According to various embodiments of the present disclosure, the random-access method of the terminal may further include receiving level information and a base-station reference signal from the base station and recognizing a level based on the base-station reference signal and the level information. The operation of determining whether to perform beam-based random access may determine whether to join beam-based random access based on the recognized level and the measured reception strength.

According to various embodiments of the present disclosure, a random-access method of a terminal includes: receiving random-access resource information, level information, a base-station reference signal, and a pilot signal from a base station; recognizing a level based on the level information and the base-station reference signal; measuring the reception strengths of pilot signals corresponding to the recognized level; selecting a random-access resource based on the measured reception strengths of the pilot signals; and performing beam-based random access using the selected random-access resource.

The selection operation includes excluding first pilot signals from among the measured pilot signals; selecting a pilot signal having the maximum reception strength from among second pilot signals remaining after excluding the first pilot signals; and selecting a random-access resource corresponding to the selected pilot signal.

The first pilot signals indicate pilot signals having the maximum reception strength in other levels, and the second pilot signals are pilot signals remaining after the first pilot signals are excluded from the received pilot signals.

The selection operation selects a random-access resource corresponding to a pilot signal having the maximum reception strength from among the measured pilot signals.

Methods stated in claims and/or specifications according to various embodiments may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

Although the embodiment has been described in the detailed description of the present disclosure, the present disclosure may be modified in various forms without departing from the scope of the present disclosure. Therefore, the scope of the present disclosure should not be defined as being limited to the embodiments, but should be defined by the appended claims and equivalents thereof.

The invention claimed is:

1. A method for random access (RA) in a base station, the method comprising:
   transmitting a pilot signal for RA of a terminal through each of a plurality of beams;
   determining a number of at least one RA preamble received by the base station without collision from among a plurality of preambles for the RA transmitted from a plurality of terminals;
   determining a beam width based on the determined number of the at least one RA preamble; and
   transmitting the pilot signal through at least one beam of the determined beam width.

2. The method as claimed in claim 1, wherein a number of the at least one beam is determined based on the determined beam width.

3. The method as claimed in claim 1, further comprising:
   broadcasting resource information for transmitting the at least one RA preamble,
   wherein the resource information comprises resource information for the RA using a beam and resource information for the RA without using a beam.

4. The method as claimed in claim 3, wherein the resource information further comprises information on a level associated with a gain of a beam,
   wherein the determining of the beam width further comprises determining a gain of the at least one beam based on the information on the level, and
   wherein the transmitting the pilot signal through at least one beam of the determined beam width comprises transmitting the pilot signal through at least one beam of the determined beam width according to the determined beam gain.

5. The method as claimed in claim 4, wherein, if the at least one beam is multiple beams, a part of the multiple beams overlap each other based on the determined beam width and the determined beam gain.

6. The method of claim 5, wherein an overlapping area in which the multiple beams overlap corresponds to the level associated with the gain of the beam.

7. The method of claim 5, wherein the gain comprises a gain obtained by the overlapped multiple beams.

8. The method of claim 1, wherein the determining of the beam width comprises determining the beam width based on a number of terminals performing beam-based RA for the base station.

9. A base station comprising:
   at least one transceiver configured to transmit a pilot signal for RA of a terminal through each of a plurality of beams; and
   at least one processor configured to determine a number of at least one RA preamble received by the base station without collision from among a plurality of preambles for the RA transmitted from a plurality of terminals, and determine a beam width based on the determined number of the at least one RA preamble, wherein the at least one transceiver is further configured to transmit the pilot signal through at least one beam of the determined beam width.

10. The base station of claim 9, wherein a number of the at least one beam is determined based on the determined beam width.

11. The base station of claim 9, wherein the at least one transceiver is further configured to broadcast resource information for transmitting the at least one RA preamble, and
wherein the resource information comprises resource information for the RA using a beam and resource information for the RA without using a beam.

12. The base station of claim 11, wherein the resource information further comprises information on a level associated with a gain of a beam,
wherein the at least one processor is further configured to determine a gain of the at least one beam based on the information on the level, and
wherein the at least one transceiver is further configured to transmit the pilot signal through at least one beam of the determined beam width according to the determined beam gain.

13. The base station of claim 12, wherein, if the at least one beam is multiple beams, a part of the multiple beams overlap each other based on the determined beam width and the determined beam gain.

14. The base station of claim 13, wherein an overlapping area in which the multiple beams overlap corresponds to the level associated with the gain of the beam.

15. The base station of claim 13, wherein the gain comprises a gain obtained by the overlapped multiple beams.

16. The base station of claim 9, wherein the determining of the beam width comprises determining the beam width based on a number of terminals performing beam-based RA for the base station.

17. A base station comprising:
at least one processor configured to determine at least one level for overlapping a part of beams; and
at least one transceiver configured to transmit a reference signal and resource information for RA,
wherein the at least one processor is further configured to determine gains for the beams based on the at least one determined level, and
wherein the at least one transceiver is further configured to transmit pilot signals for RA through the beams according to the determined gains.

18. The base station of claim 17, wherein an overlapping area in which the beams overlap corresponds to the at least one level.

19. The base station of claim 17, wherein the at least one transceiver is further configured to:
receive an RA preamble generated based on the pilot signals for RA, through at least one of the beams.

20. The base station of claim 19, wherein the RA preamble is received in an overlapping area in which the beams overlap.

* * * * *